United States Patent
Noguchi et al.

(10) Patent No.: US 9,447,851 B2
(45) Date of Patent: Sep. 20, 2016

(54) STRUCTURE OF POWER TRANSMISSION APPARATUS

(71) Applicant: DENSO CORPORATION, Kariya, Aichi-pref. (JP)

(72) Inventors: Hitoshi Noguchi, Handa (JP); Hiroshi Okada, Kariya (JP); Tomoaki Nakano, Toyota (JP); Yoshihiro Yamashita, Anjo (JP); Yousuke Yamamoto, Kariya (JP); Kazuhisa Hara, Ichinomiya (JP); Toshihisa Nakajima, Kariya (JP); Kazuki Matsuo, Okazaki (JP); Toshikazu Mori, Okazaki (JP); Shuhei Oe, Aichi-ken (JP); Hikaru Kokumai, Nishio (JP); Kiyoshi Iwade, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/573,296

(22) Filed: Dec. 17, 2014

(65) Prior Publication Data

US 2015/0167797 A1    Jun. 18, 2015

(30) Foreign Application Priority Data

Dec. 17, 2013   (JP) .................................. 2013-259995
Nov. 28, 2014   (JP) .................................. 2014-240982

(51) Int. Cl.
*F16H 7/22*      (2006.01)
*F16H 7/12*      (2006.01)
(Continued)

(52) U.S. Cl.
CPC ......... *F16H 7/1281* (2013.01); *F02N 11/0814* (2013.01); *F02N 15/02* (2013.01); *F02B 67/06* (2013.01); *F02N 11/04* (2013.01); *F02N 11/0844* (2013.01); *F02N 15/08* (2013.01); *F02N2200/125* (2013.01); *F16H 2007/0812* (2013.01); *F16H 2007/0885* (2013.01); *Y02T 10/48* (2013.01); *Y10S 903/909* (2013.01); *Y10T 477/23* (2015.01)

(58) Field of Classification Search
None
See application file for complete search history.

(56) References Cited

U.S. PATENT DOCUMENTS 4,478,595 A * 10/1984 Hayakawa ............ F02B 77/081
                                                      474/109
6,821,223 B2 * 11/2004 Henry ...................... F01L 1/34
                                                      474/109
(Continued)

FOREIGN PATENT DOCUMENTS

JP        11-190223       7/1999
JP        2001-059555     3/2001
(Continued)

OTHER PUBLICATIONS

Office Action (3 pages) dated Dec. 1, 2015 issued in corresponding Japanese Application No. 2014-240982 and English translation (3 pages).

*Primary Examiner* — Dirk Wright
(74) *Attorney, Agent, or Firm* — Nixon & Vanderhye P.C.

(57) ABSTRACT

A power transmission system transmits power from an internal combustion engine to a first and a second auxiliary device through an endless transmitting member. Prior to issuing of an engine start request, the first auxiliary device is actuated to move a tensioner pulley to a given position to increase the degree of tension of the endless transmitting member. The actuation of the first auxiliary device as an engine starter upon the issuing of the engine start request, therefore, enables a drive shaft of the engine to be rotated immediately within a required time to crank the engine. This achieves a quick start of the engine and results in a decrease in amount of time between the issuing of the engine start request and the actual start of the engine.

9 Claims, 17 Drawing Sheets

(51) Int. Cl.
*F02N 15/02* (2006.01)
*F02N 11/08* (2006.01)
*F02B 67/06* (2006.01)
*F16H 7/08* (2006.01)
*F02N 11/04* (2006.01)
*F02N 15/08* (2006.01)

(56) References Cited

U.S. PATENT DOCUMENTS

| | | | |
|---|---|---|---|
| 7,086,373 B2* | 8/2006 | Serkh | F01L 1/024 |
| | | | 123/195 A |
| 7,217,206 B2* | 5/2007 | Stone | F01L 1/024 |
| | | | 474/110 |
| 9,151,366 B2* | 10/2015 | Antchak | B60K 25/02 |
| 2013/0276576 A1 | 10/2013 | Noguchi et al. | |
| 2014/0309882 A1* | 10/2014 | Antchak | F02B 67/06 |
| | | | 701/36 |

FOREIGN PATENT DOCUMENTS

| | | |
|---|---|---|
| JP | 2003-314322 | 11/2003 |
| JP | 2004-245121 | 9/2004 |
| JP | 2007-292079 | 11/2007 |
| JP | 2010-196579 | 9/2010 |
| JP | 2013-224696 | 10/2013 |
| JP | 2014-058900 | 4/2014 |

* cited by examiner

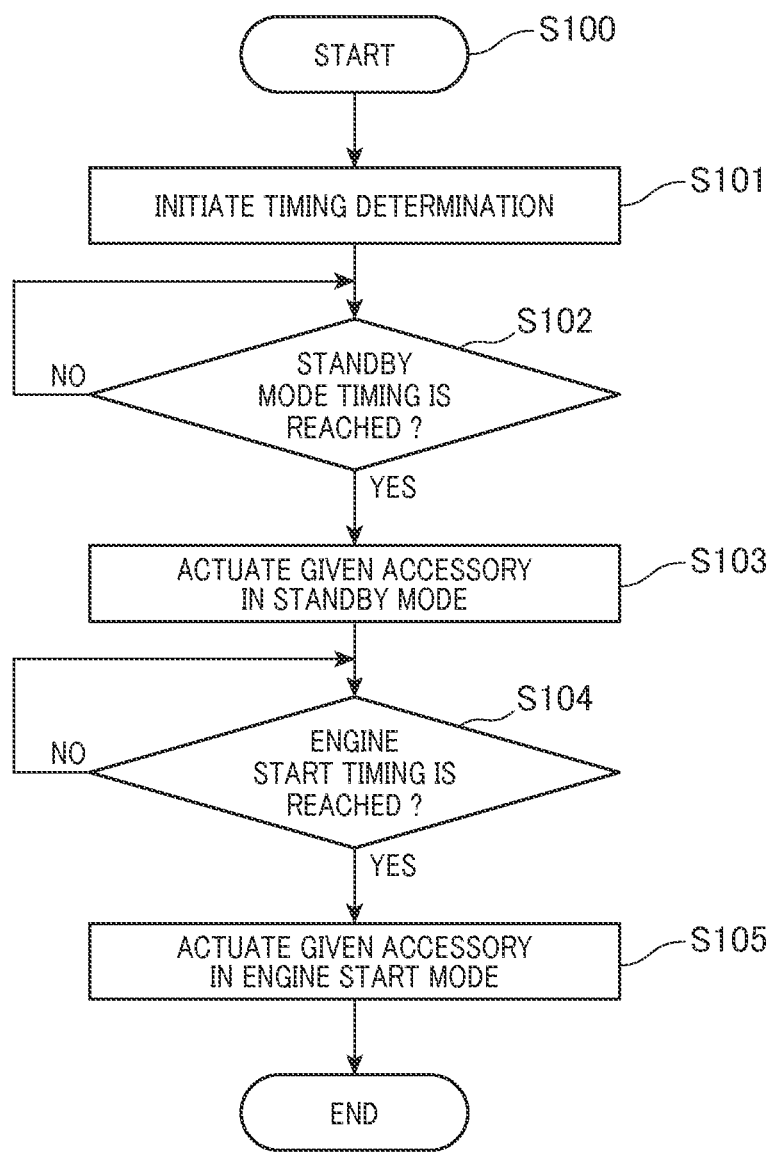

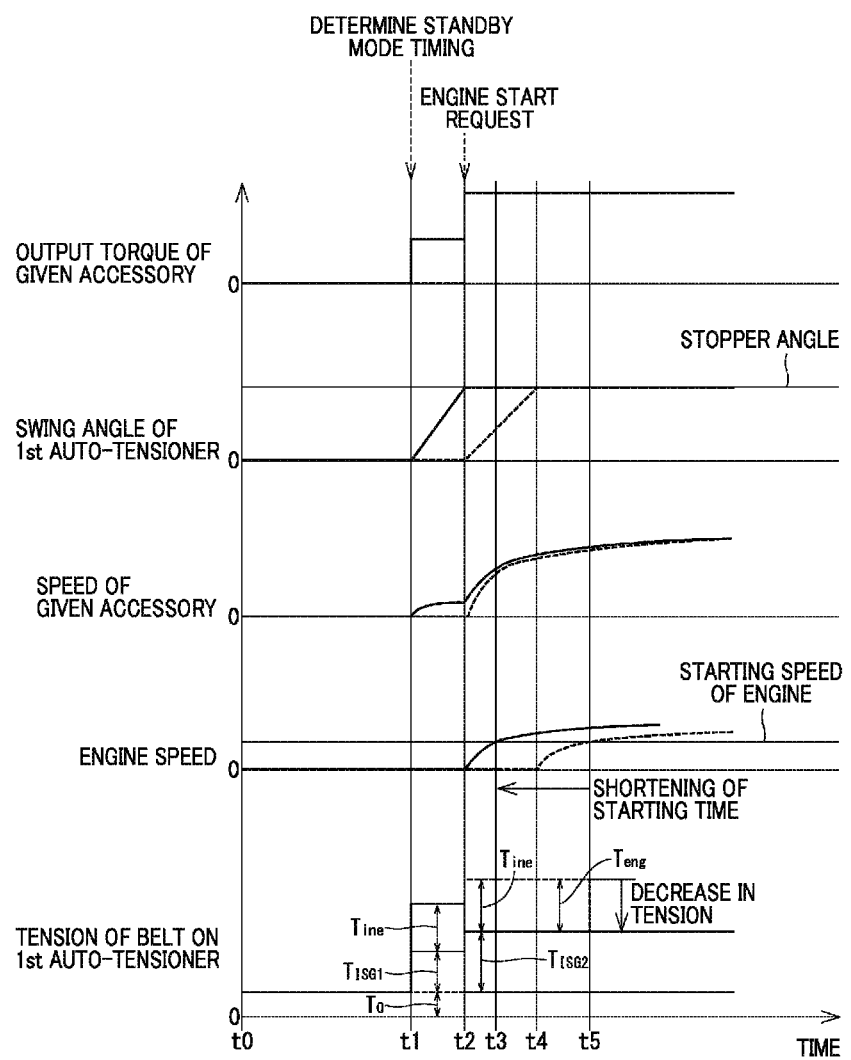

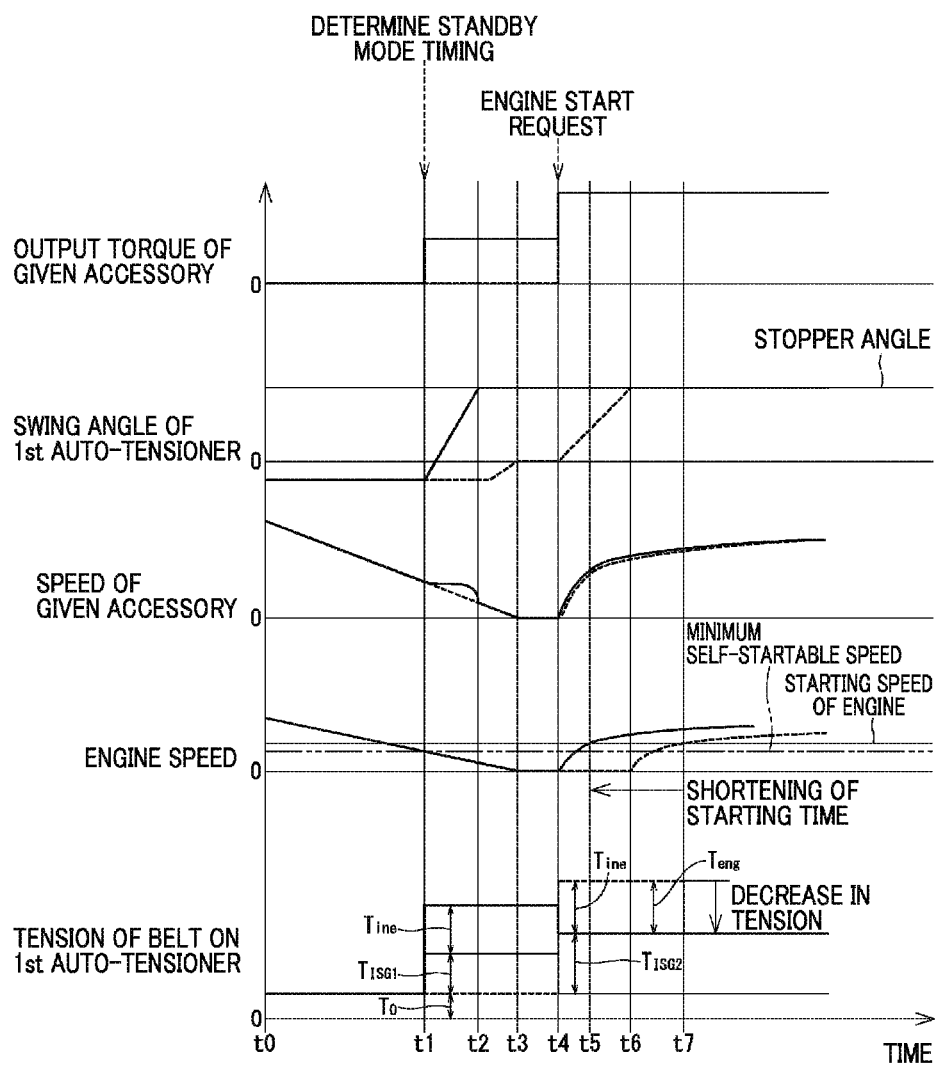

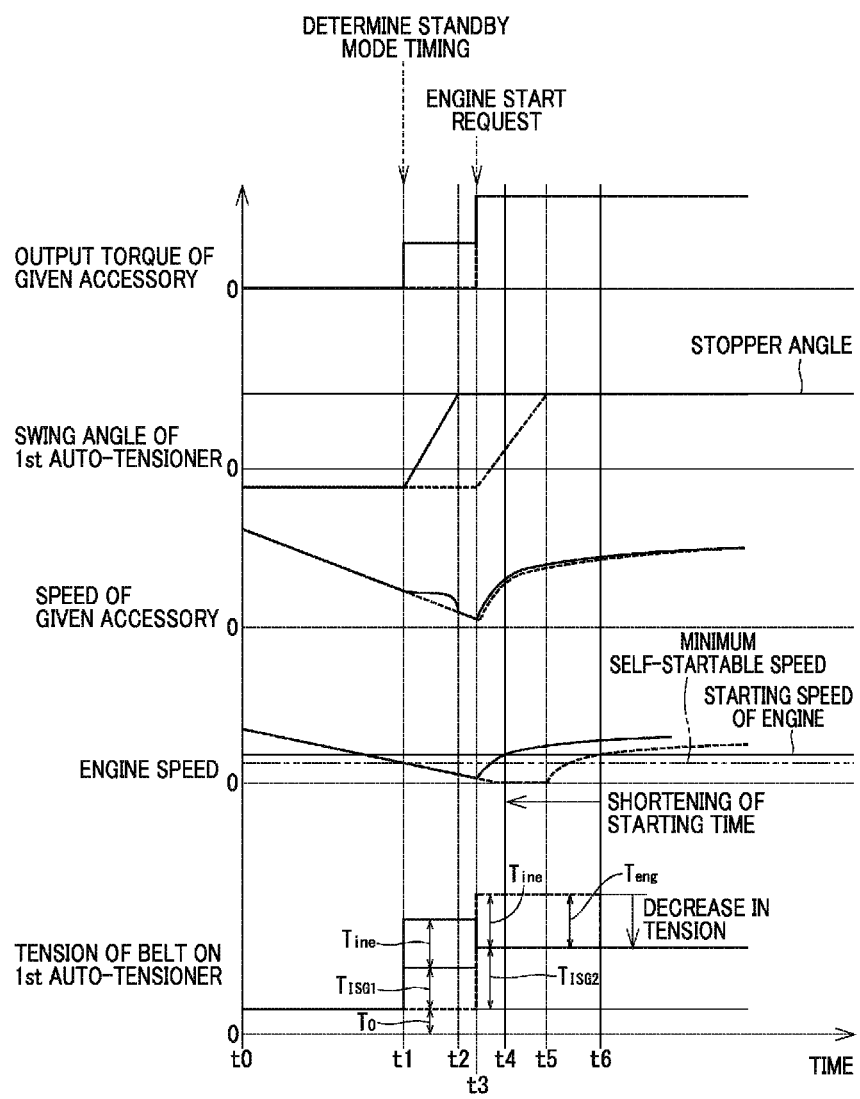

STRUCTURE OF POWER TRANSMISSION APPARATUS

CROSS REFERENCE TO RELATED DOCUMENT

The present application claims the benefit of priority of Japanese Patent Application No. 2013-259995 filed on Dec. 17, 2013 and Japanese Patent Application No. 2014-240982 filed on Nov. 28, 2014, disclosures of which are incorporated herein by reference.

BACKGROUND OF THE INVENTION

1. Technical Field

This disclosure relates generally to a power transmission apparatus designed to transmit power, as produced by an internal combustion engine, to auxiliary devices.

2. Background Art

There are known power transmission systems which work to transmit output power of an internal combustion engine to a given accessory and other accessories mounted in, for example, an automobile using an endless transmitting member such as a belt. The given accessory is, for instance, an engine starter to start the internal combustion engine. The given accessory may be rotated by the output power of the internal combustion engine along with the other accessories in a regenerative mode of operation to generate electricity. Japanese Patent First Publication No. 2001-59555 teaches a power transmission system which has two auto-tensioners to adjust the degree of tension of an endless transmitting member to a required level.

The power transmission system, as disclosed in the above publication, has a first auto-tensioner that is one of the two auto-tensioners. The first auto-tensioner is disposed between a driving pulley connected to the internal combustion engine and a pulley of a given accessory installed in an automotive vehicle to be movable relative to the internal combustion engine for regulating the degree of tension of the endless transmitting member. The given accessory is designed to operate selectively as an engine starter (i.e., an electric motor) and an electric generator. When the given accessory operates as the electric generator in a regenerative mode, the first auto-tensioner works to eliminate the loosening of the endless transmitting member between the given accessory and its pulley. Alternatively, when the given accessory operates as the engine starter in a motor mode, it increases the degree of tension of the endless transmitting member between the driving pulley and the pulley of the given accessory, thereby moving the pulley of the first auto-tensioner to a limit of a relative movable range thereof. When the pulley of the first auto-tensioner reaches the limit of the relative movable range, the endless transmitting member rotates the driving pulley through its driving shaft to crank the internal combustion engine.

The power transmission system of the above publication is engineered to start operating the given accessory in the motor mode after it is required to start the internal combustion engine, thus taking time for the pulley of the first auto-tensioner to reach the limit of the relative movable range, thus resulting in a time lag in cranking the internal combustion engine.

When the internal combustion engine is being cranked, a difference in circumferential speed among the pulley of the given accessory, the driving pulley, and the first auto-tensioner will be great. Therefore, when the driving pulley and the pulley of the first auto-tensioner are started to be rotated suddenly by the pulley of the given accessory after they are stopped or when running at low speeds, the inertia thereof may result in a great increase in tension of the endless transmitting member. This requires the need for making the endless transmitting member of material resistant to such a degree of tension, which will lead to an increase in production cost of the power transmission system.

The power transmission system also faces the drawback in that when it is instructed to operate the given accessory in the motor mode after issuing of a request to start the internal combustion engine, it will result in a lag in producing a field current in the given accessory, thus leading to a delay in starting the given accessory in the motor mode. This also results in an increased lag in starting the internal combustion engine.

SUMMARY

It is therefore an object to provide an improved structure of a power transmission system designed to minimize a time interval between issuing of a request to start an internal combustion engine and an actual start of the internal combustion engine.

According to one aspect of the invention, there is provided a power transmission system which works to transmit power, as produced by an internal combustion engine, to a first auxiliary device and a second auxiliary device. The first auxiliary device is operable either in a motor mode or in a regenerative mode. The power transmission system comprises: (a) a driving pulley which is joined to a drive shaft of the internal combustion engine to be rotatable along with rotation of the drive shaft; (b) a first auxiliary device pulley which is joined to a shaft of the first auxiliary device to be rotatable along with rotation of the shaft of the first auxiliary device; (c) a second auxiliary device pulley which is joined to a shaft of the second auxiliary device to be rotatable along with rotation of the shaft of the second auxiliary device; (d) an endless transmitting member which is wound around the driving pulley, the first auxiliary device pulley, and the second auxiliary device pulley; (e) a first auto-tensioner equipped with a first tensioner pulley which is rotatable in contact with the endless transmitting member, the first tensioner pulley being also movable relative to the internal combustion engine to change or regulate a degree of tension of the endless transmitting member; and (f) a controller which works to control an operation of the first auxiliary device. The controller actuates the first auxiliary device to move the first tensioner pulley to a given position prior to issuing of a start request to start the internal combustion engine, thereby minimizing the loosening of the belt between the driving pulley and the first auxiliary device pulley in the motor mode.

Prior to the issuing of the start request to start the internal combustion engine, the controller actuates the first auxiliary device in the motor mode to move the first tensioner pulley to the given position. Upon the issuing of the start request for the internal combustion engine, the first tensioner pulley, thus, lies at the given position, so that the degree of tension of the endless transmitting member between the driving pulley and the first auxiliary device pulley is higher than or equal to a required value. The actuation of the first auxiliary device as a starter in the motor mode to produce torque great enough for cranking the internal combustion engine upon the issuing of the start request, therefore, enables the drive shaft to be rotated immediately within a required period of time to crank the internal combustion engine. This achieves a quick start of the internal combustion engine and results in a decrease in amount of time between the issuing of the start request for the internal combustion engine and the actual start of the internal combustion engine.

With the above arrangements of the power transmission system, upon the issuing of the start request for the internal combustion engine, a difference in circumferential speed among the first accessory pulley, the driving pulley, and the first tensioner pulley is decreased, thereby avoiding an increase in degree of tension of the endless transmitting member which will arise from the inertia of the driving pulley and the first tensioner pulley, as developed when they start to be rotated suddenly by the first auxiliary device pulley after they are stopped or when rotating at a low speed.

When the first auxiliary device is operating in the motor mode upon the issuing of the start request for the internal combustion engine, it eliminates a lag in producing a field current in the first auxiliary device which will result in a delay in starting the first auxiliary device in the motor mode.

When the given position is selected to be a limit of a relative movable range in which the first tensioner pulley is movable relative to the internal combustion engine, the actuation of the first auxiliary device as the starter upon the issuing of the start request for the internal combustion engine will result in a quick rotation of the drive shaft, that is, quick cranking of the internal combustion engine, thus further decreasing the time interval between the issuing of the start request for the internal combustion engine and the actual start of the internal combustion engine.

The power transmission system may also include a second auto-tensioner equipped with a second tensioner pulley which is disposed to be rotatable in contact with the endless transmission member on an opposite side of the first auxiliary device pulley to the first tensioner pulley. The second tensioner pulley is movable relative to the internal combustion engine to change the degree of tension of the endless transmission member, thereby eliminating the loosening of the endless transmitting member on the opposite side of the first auxiliary pulley to the first tensioner pulley.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 14 is a flowchart of a sequence of logical steps or timing determination program executed by a controller of the power transmission system of the eighth embodiment;

FIG. 15 is a time chart which demonstrates operations of a power transmission system according to the eighth embodiment.

FIG. 16 is a time chart which demonstrates operations of a power transmission system in a first example according to the tenth embodiment; and FIG. 17 is a time chart which demonstrates operations of a power transmission system in a second example according to the tenth embodiment.

DESCRIPTION OF THE PREFERRED EMBODIMENTS

Figure 1:
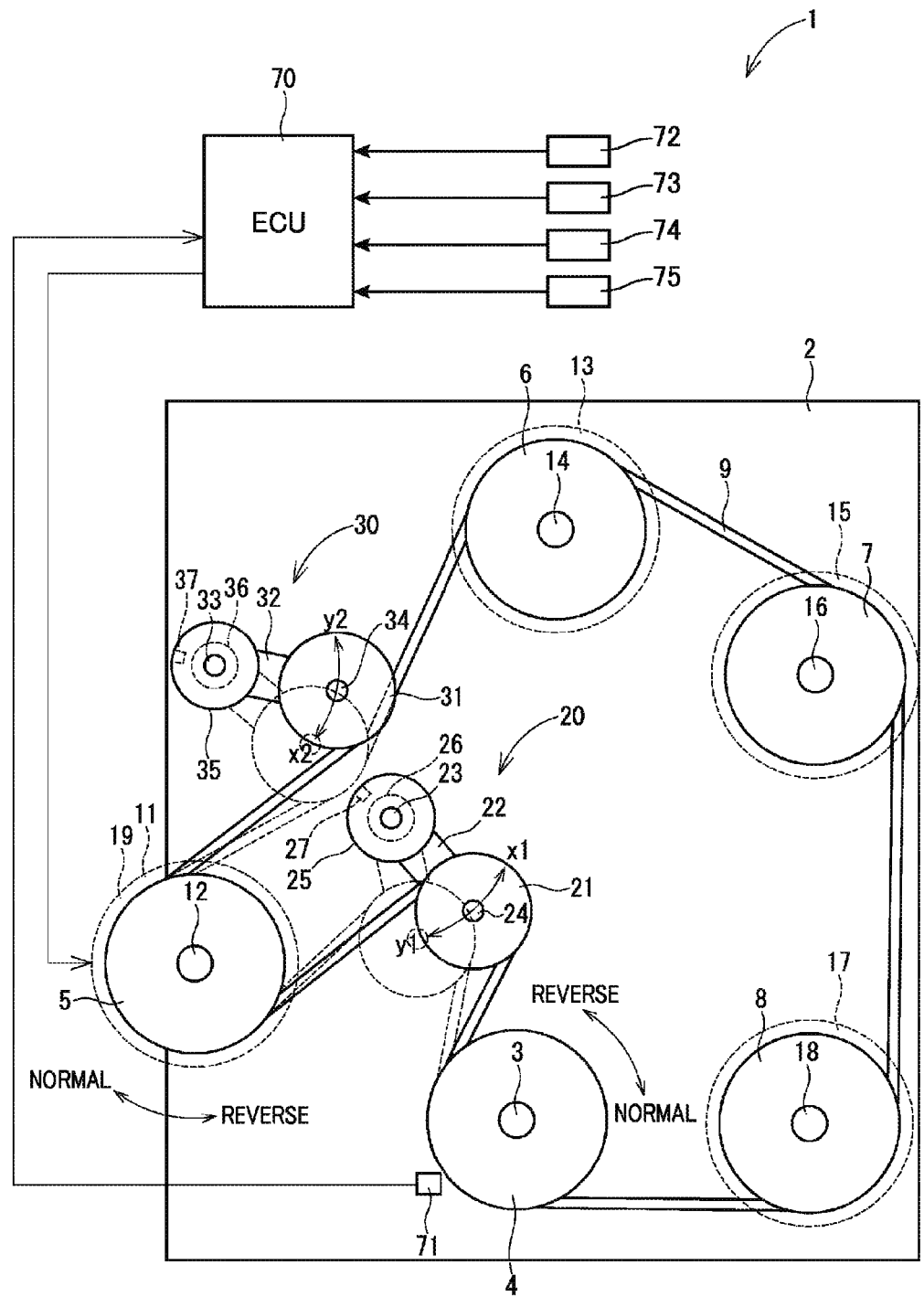
FIG. 1 is a schematic view which illustrates a power transmission system according to a first embodiment.

Referring to the drawings, wherein like reference numbers refer to like parts in several views, there are shown power transmission systems according to embodiments.

First Embodiment

FIG. 1 illustrates a power transmission system 1 according to the first embodiment. The power transmission system 1, as referred to herein, is installed in an automotive vehicle equipped with an internal combustion engine 2 and works to transmit output power (i.e., torque), as produced by the engine 2, to a given accessory 11 and other accessories 13, 15, and 17 mounted in the vehicle. The accessories 11, 13, 15, and 17, as referred to herein, are auxiliary electric or mechanical devices which are supplied with or transmit power or torque from or to the internal combustion engine 2. The given accessory 11 will also be referred to below as a first auxiliary device. The accessories 13, 15, and 17 will also be referred to below as second auxiliary devices.

The power transmission system 1 is, as clearly illustrated in FIG. 1, disposed near the engine 2. The power transmission system 1 includes a driving pulley 4, a given accessory pulley 5, accessory pulleys 6, 7, and 8, a belt 9 (i.e., an endless transmitting member), a first auto-tensioner 20, a second auto-tensioner 30, and an electronic control unit (ECU) 70 working as a controller. The given accessory pulley 5 will also be referred to below as a first auxiliary device pulley. The accessory pulleys 6, 7, and 8 will also be referred to below as second auxiliary device pulleys.

The driving pulley 4 is in the shape of a disc and joined at the center thereof to a drive shaft 3 (i.e., an output shaft) of the engine 2, so that the driving pulley 4 is rotatable following rotation of the drive shaft 3. The given accessory pulley 5 is in the shape of a disc and joined at the center thereof to a shaft 12 of the given accessory 11, so that the given accessory pulley 5 is rotatable along with the shaft 12. The accessory pulleys 6, 7, and 8 are each in the shape of a disc and joined at centers thereof to shafts 14, 16, and 18 of the accessories 13, 15, and 17, so that they are rotatable along with the accessories 13, 15, and 17.

The drive shaft 3 has an end joined to an input shaft of a transmission (i.e., a controlled object) installed in the vehicle through, for example, a clutch (not shown) on the opposite side to the driving pulley 4. The transmission is joined at an output shaft thereof to an axle of the vehicle through a differential gear (not shown). When the clutch connects between the drive shaft 3 and the input shaft of the transmission, rotation of the drive shaft 3 is transmitted to driving wheels attached to ends of the axle through the output shaft of the transmission, the differential gear, and the axle, thereby running the vehicle.

The belt 9 is made of, for example, rubber or wire in the shape of an endless loop. The belt 9 expands or contracts elastically when subjected to an external force. The belt 9 is wound around the driving pulley 7, the given accessory pulley 5, and the accessory pulleys 6, 7, and 8. Rotation of the driving pulley 4 will be, therefore, transmitted to the accessory pulleys 8, 7, and 6 and the given accessory pulley 5, so that they rotate. In other words, the rotation of each of the driving pulley 4, the accessory pulleys 8, 7, and 6 and the given accessory pulley 5 is transmitted through the belt 9 to another. In the example illustrated in FIG. 1, when the engine 2 is running in a normal mode of operation, the direction of rotation of the drive shaft 3, i.e., the driving pulley 4 is a clockwise direction. The belt 9, the driving pulley 7, the given accessory pulley 5, and the accessory pulleys 6, 7, and 8, thus, rotate in the clockwise direction. In the following discussion, the clockwise direction, as viewed in FIG. 1, will also be referred to as a normal direction, while a counterclockwise direction will also be referred to as a reverse direction below.

The given accessory 11, as referred to in this embodiment, is a motor-generator which selectively operations in two modes: a motor mode (also called a power mode) and a regenerative mode. In the motor mode, the motor-generator is supplied with electric power from, for example, a battery installed in the vehicle, so that the shaft 12 rotates. In the regenerative mode, torque is inputted to the shaft 12, so that the motor-generator generates electricity. Specifically, the given accessory 11 works as a starter to start the engine 2. When the engine 2 is at rest, and it is required to start the engine 2, the given accessory 11 enters the motor mode and rotates the driving pulley 4 to crank the engine 2.

When the engine 2 is running, that is, the belt 8 is rotating, the given accessory 11 also works as an assist motor in the motor mode. Specifically, the given accessory 11 gives additional rotation to the drive shaft 3 through the driving pulley 4 to assist in accelerating the vehicle.

When the engine 2 is running, that is, the belt 8 is rotating, and it is required to operate the given accessory 11 in the regenerative mode, the given accessory 11 works as a generator and is supplied with torque through the driving pulley 5, so that the given accessory 11 produces electric energy and stores it in, for example, the battery mounted in the vehicle.

As apparent from the above discussion, the given accessory 11 is implemented by a multifunctional device such as an ISG (Integrated Starter Generator).

The accessories 13, 15, and 17 are, for example, a water pump, an air conditioner compressor, and a power steering pump and driven by input of torque to the shafts 14, 16, and 18, respectively. In other words, the accessories 13, 15 and 17 are driven following the rotation of the belt 9.

In the power transmission system 1, a maximum loosened position of the belt 9 where the belt 9 is loosened greatest, in other words, the degree of tension of the belt 9 is the smallest usually changes with an operation of the given accessory 11. For instance, when the given accessory is in the motor mode, the maximum loosened position of the belt 9 lies between the given accessory pulley 5 and the accessory pulley 6. When the given accessory is in the regenerative mode, the maximum loosened position of the belt 9 lies between the driving pulley 4 and the given accessory pulley 5. The tension of the belt 9 also changes with the operation of the given accessory 11.

Figure 2:
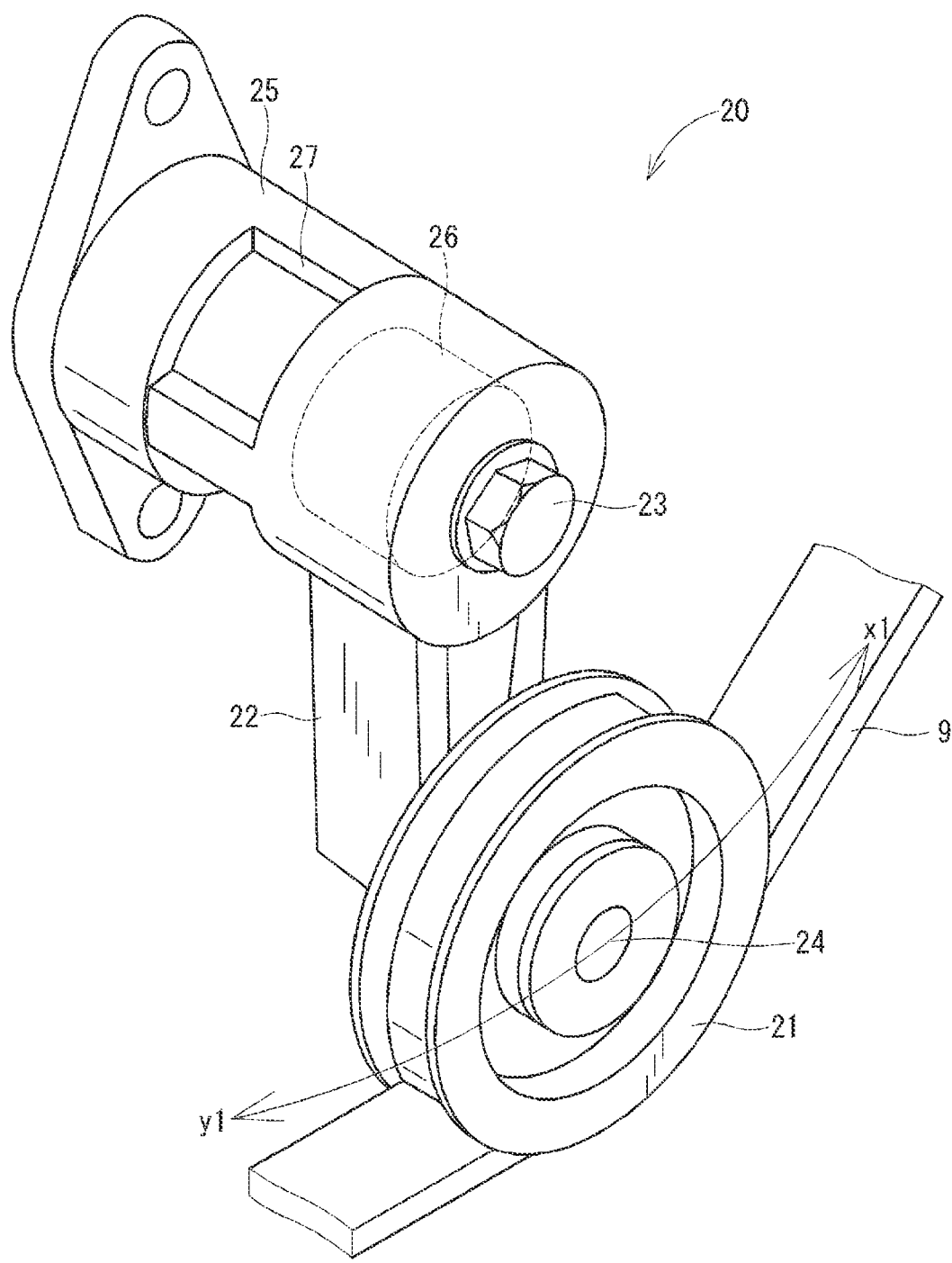
FIG. 2 is a perspective view which illustrates the first auto-tensioner installed in the power transmission system of FIG. 1.

The first auto-tensioner 20 includes, as clearly illustrated in FIGS. 1 and 2, a first tensioner pulley 21, an arm 22, shafts 23 and 24, a hollow cylindrical base 25, a coil spring 26 working as a biasing mechanism, and a stopper 27. The first tensioner pulley 21 is in the shape of a disc and placed in contact with the belt 9 between the driving pulley 4 and the given accessory pulley 5.

The arm 22 is in the shape of a strip. The shaft 23 is joined to an end of the arm 22. The shaft 23 is retained by the base 25 secured to a wall surface of the engine 2 and bears the end of the arm 22, so that the arm 22 is rotatable about the shaft 23 relative to the engine 1. The shaft 24 is joined to the end of the arm 22 which is far away from the end thereof to which the shaft 23 is joined. The shaft 24 bears the center of the first tensioner pulley 21 to be rotatable. With the above arrangements, the first tensioner pulley 21 is retained by the engine 2 to be rotatable in contact with the belt 9 between the driving pulley 4 and the given accessory pulley 5 and movable or swingable about the shaft 23 relative to the engine 2 in either of a direction x1 or a direction y1. When the arm 22 swings about the shaft 23, so that the position of the first tensioner pulley 21 changes relative to the engine 2, it will cause the tension of the belt 9 between the driving pulley 4 and the given accessory pulley 5 to change.

The base 25 is, as described above, fixed on the wall surface of the engine 2 and has the shaft 23 arranged at the center of the base 25, so that the base 25 and the end of the arm 22 may rotate relative to each other.

The coil spring 26 is disposed between the base 25 and the end of the arm 22. Specifically, the coil spring 26 is connected at an end thereof to the base 25 and at the other end to the end of the arm 22. The coil spring 26 works to create resistance to relative rotation of the base 25 and the arm 22, that is, to torsion applied thereto. The coil spring 26 works as a biasing mechanism to bias the first tensioner pulley 21 in the direction x1 in which the tension of the belt 9 increases.

The stopper 27 is, as illustrated in FIG. 2, formed on the base 22. When the arm 22 rotates relative to the base 22 in the direction y1 opposite the direction x1, a portion of the end of the arm 22 hits the stopper 27, so that the arm 22 is held from rotating further in the direction y1. Specifically, the stopper 27 works to stop the arm 22 and the first tensioner pulley 21 from rotating over a given angular position in the direction y1. The given angular position is defined at a limit of a relative movable range of the first tensioner pulley 21.

The first auto-tensioner 20, as apparent from the above discussion, works to regulate the degree of tension of the belt 9 through the swinging motion of the first tensioner pulley 21 relative to the engine 2 (i.e., about the shaft 23) in the direction x1 or y1. The first auto-tensioner 20 eliminates the loosening of the belt 9 between the driving pulley 4 and the given accessory pulley 5 when the given accessory 11 operates in the regenerative mode.

The second auto-tensioner 30 includes a second tensioner pulley 31, an arm 32, shafts 33 and 34, a coil spring 36, a hollow cylindrical base 35, and a stopper 37.

The second tensioner pulley 31 is, like the first tensioner pulley 21, in the shape of a disc and placed in contact with the belt 9 between the given accessory pulley 5 and the accessory pulley 6, that is, located on the opposite side of the given accessory pulley 5 to the first tensioner pulley 21.

The arm 32 is, like the arm 22, in the shape of a strip. The shaft 33 is joined to an end of the arm 32. The shaft 33 is retained by the base 35 secured to the wall surface of the engine 2 and bears the end of the arm 23, so that the arm 32 is rotatable about the shaft 33 relative to the engine 1. The shaft 34 is joined to the end of the arm 32 which is far away from the end thereof to which the shaft 33 is joined. The shaft 34 bears the center of the second tensioner pulley 31 to be rotatable. With the above arrangements, the second tensioner pulley 31 is retained by the engine 2 to be rotatable in contact with the belt 9 between the given accessory pulley 5 and the accessory pulley 6 and movable or swingable about the shaft 33 relative to the engine 2 in either of a direction x2 or a direction y2. When the arm 32 swings about the shaft 33, so that the position of the second tensioner pulley 31 changes relative to the engine 2, it will cause the tension of the belt 9 between the given accessory pulley 5 and the accessory pulley 6 to change.

The base 35 is, as described above, fixed on the wall surface of the engine 2 and has the shaft 33 arranged at the center of the base 35, so that the base 35 and the end of the arm 32 may rotate relative to each other.

The coil spring 36 is disposed between the base 35 and the end of the arm 32. Specifically, the coil spring 36 is connected at an end thereof to the base 35 and at the other end to the end of the arm 32. The coil spring 36 works to create resistance to relative rotation of the base 35 and the arm 32, that is, to torsion applied thereto. The coil spring 36 works as a biasing mechanism to bias the second tensioner pulley 31 in the direction x2 in which the tension of the belt 9 increases.

The stopper 37 is, like the stopper 27, formed on the base 32. When the arm 32 rotates relative to the base 32 in the direction y2 opposite the direction x2, a portion of the end of the arm 32 hits the stopper 37, so that the arm 32 is held from rotating further in the direction y2. Specifically, the stopper 37 works to stop the arm 32 and the second tensioner pulley 31 from rotating over a given angular position in the direction y2. The given angular position is defined at a limit of a relative movable range of the second tensioner pulley 31.

The second auto-tensioner 30, as apparent from the above discussion, works to regulate the degree of tension of the belt 9 through the swinging motion of the second tensioner pulley 31 relative to the engine 2 (i.e., about the shaft 33) in the direction x2 or y2. The second auto-tensioner 30 works to eliminate the loosening of the belt 9 between the given accessory pulley 5 and the accessory pulley 6 when the given accessory 11 operates in the motor mode.

The ECU 70 is implemented by a compact computer equipped with a CPU, a ROM, a RAM, and an input-output device. The ECU 70 works as a unified controller to monitor outputs from sensors installed in the vehicle and execute tasks or programs, as stored in the ROM, to control or manage operations of devices mounted in the vehicle.

The engine 2 is equipped with a rotation sensor (also called a position sensor) 71 which works to measure an angular position of the driving pulley 4 (i.e., the drive shaft 3) and provide a signal indicative thereof to the ECU 70. The ECU 70 analyzes the output from the rotation sensor 71 to determine the angular position and rotating speed of the driving pulley 4.

The vehicle has a brake switch 72 installed on a driver's seat. The brake switch 72 measures a position of a brake pedal installed in the vehicle, that is, the amount by which the brake pedal is depressed by a vehicle driver and outputs a signal indicative thereof to the ECU 70. The ECU 70 analyzes the output from the brake pedal 72 and determines the amount by which the brake pedal is depressed.

The power transmission system 1 also includes a brake pressure sensor 74 which measures a brake pressure that is the pressure of brake fluid applied to brakes of the vehicle and outputs a signal indicative thereof to the ECU 70. The ECU 70 analyzes the output from the brake pressure sensor 74 to calculate the brake pressure.

The power transmission system 1 also includes an accelerator pedal sensor 75 installed on the accelerator pedal of the vehicle. The accelerator pedal sensor 75 monitors the depression or positon of the accelerator pedal and outputs a signal indicative thereof to the ECU 70. The ECU 70 analyzes the output from the accelerator pedal sensor 75 to determine the depressed positon of the accelerator pedal.

Prior to a request to start the engine 2, the ECU 70 operates the given accessory 11 in the motor mode to place the first tensioner pulley 21 at a given position. The given position is the limit of the relative movable range of the first tensioner pulley 21, that is, where the portion of the end of the arm 22 contacts the stopper 27.

For instance, after a lapse of a given time after a stop condition to stop the engine 2 is met, the ECU 70 drives the given accessory 11 in the motor mode to bring the first tensioner pulley 21 to the given position. The stop condition for the engine 2 is, for example, a condition where after the vehicle stops, the rotation sensor 71 detects the fact that the speed of the driving pulley 4 (i.e., the drive shaft 3) has dropped below a given value.

The operation of the power transmission system 1 will be described below with reference to FIG. 3.

Figure 3:
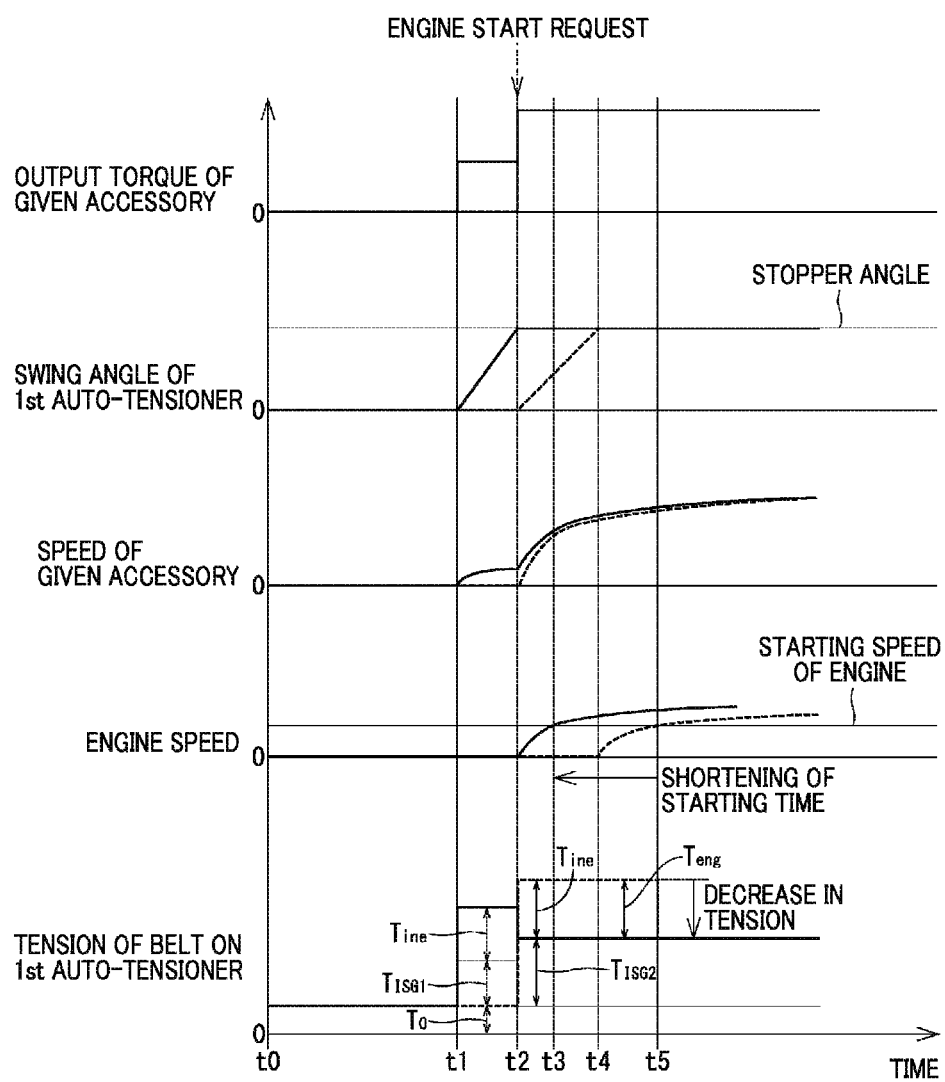
FIG. 3 is a time chart which demonstrates operations of the power transmission system of FIG. 1.

Solid lines in FIG. 3 represent operations of the components of the power transmission system 1. In the illustrated example, the stop condition for the engine 2 has been met before time t0. The speed of the engine 2 has already decreased to zero at time t0.

At time t1 after a lapse of the given time since the stop condition for the engine 2 was met, the ECU 70 starts the given accessory 11 in the motor mode. Specifically, the ECU 70 controls the operation of the given accessory 11 in the motor mode, i.e., rotates the given accessory 11 in the normal direction so as to produce a degree of torque which will move the first tensioner pulley 21 in the direction y1. This causes the tension of the belt 9 between the driving pulley 4 and the given accessory pulley 5 to increase, so that the first tensioner pulley 21, as illustrated in FIG. 1, moves or swings in the direction y1 against the pressure, as produced by the coil spring 26. Upon the start of rotation of the given accessory 11, the degree of tension of the belt 9 on the first tensioner pulley 21 is, as can be seen in FIG. 3, equal to the sum of a tension $T_0$ of the belt 9 when the given accessory 11 and the engine 2 are both at rest, a tension $T_{ISG1}$ of the belt 9, as developed by torque output from the given accessory pulley 11, and a tension $T_{ine}$ of the belt 9, as created by the inertia of the first tensioner pulley 21 when it starts to be rotated suddenly by the given accessory pulley 5 after being stopped.

After time t1, the given accessory 1 continues to operate in the motor mode, thereby bringing the portion of the end of the arm 22 into contact with the stopper 27 at time t2. The first tensioner pulley 21, thus, lies at the given position that is, as described above, the limit of the relative movable range thereof. At this time, a swing angle of the first auto-tensioner 20 that is an angle which the arm 22 makes with the engine 2 (i.e., the base 25), that is, the arm 22 makes with an initial angular position thereof before time t1 will be a stopper angle that is an angle which the arm 22 makes with the initial angular position when the arm 22 contacts the stopper 27. When the engine 2 is at rest, the swing angle of the first auto-tensioner 20 is zero.

When an engine start condition is met, so that a start request to start the engine 2 is made at time t2, the ECU 70 actuates the given accessory 11 as a starter in the motor mode to output a degree of torque great enough to crank the engine 2. At this time, the first tensioner pulley 21 lies at the limit of the relative movable range, so that the tension of the belt 9 between the driving pulley 4 and the given accessory pulley 5 is above a required value. Accordingly, when the ECU 70 actuates the given accessory 11 as the starter at time t2, it immediately rotates the drive shaft 3 (i.e., the driving pulley 4) to crank the engine 2, so that the engine 2 starts at time t3. In this example, the engine start condition is a condition where the brake switch 72 has detected the fact that the vehicle driver has released the brake pedal of the vehicle. The degree of torque outputted from the given accessory 11 after time t2 is higher than that outputted therefrom between time t1 to time t2.

After time t2, the degree of tension of the belt 9 on the first tensioner pulley 21 will be equal to, as can be seen in FIG. 3, the sum of the tension $T_0$ of the belt 9 when the given accessory 11 and the engine 2 are both at rest and a tension $T_{ISG2}$ of the belt 9, as developed by torque output from the given accessory pulley 11. Specifically, after time t2, a difference in circumferential speed among the given accessory pulley 5, the driving pulley 4, and the first tensioner pulley 21 is decreased, thereby eliminating a component of the tension of the belt 9 which will arise from the inertia of the driving pulley 4 and the first tensioner pulley 21, as developed when they start to be rotated suddenly by the given accessory pulley 5 after they are stopped or when rotating at a low speed.

At time t2 where the engine start request is made, the given accessory 11 is, as described above, operating in the motor mode, thereby eliminating a lag in producing a field current in the given accessory 11 which will result in a delay in starting the given accessory 11 in the motor mode.

Next, a comparative example of a power transmission system will be discussed below in order to facilitate a better understanding of beneficial advantages, as offered by this embodiment.

The power transmission system, as referred to herein as the comparative example, has substantially the same physical structure as that of the power transmission system 1, but is engineered not to actuate the given accessory 11 prior to the start request to start the engine 1. Operations of parts of the power transmission system are represented by broken lines in FIG. 3.

When a start request to start the engine 2 is made at time t2, the ECU 70 actuates the given accessory 11 as a starter in the motor mode to output a degree of torque great enough to crank the engine 2. The speed of the given accessory 11, thus, increases after time t2. This results in an increase in swing angle of the first auto-tensioner 20. When the swing angle of the first auto-tensioner 20 reaches the stopper angle that is, as described above, an angle at which the arm 22 contacts the stopper 27 at time t4, it will cause the drive shaft 3 to start rotating, so that the engine 2 starts at time t5. As apparent from the above, the comparative example of the power transmission system consumes a relatively long time between the issuing of the start request to start the engine 2 (i.e., time t2) and the actual start of the engine 2 (i.e., time t5). In contrast to this, the power transmission system 1 of this embodiment is designed to complete the start of the engine 2 in less time after the start request is made to start the engine 2.

In the comparative example, between start of the motor mode of the given accessory 11 after the start request is made to start the engine 2 (i.e., time t2) and start of rotation of the drive shaft 3 (i.e., time t4), the degree of tension of the belt 9 on the first tensioner pulley 21 is, as can be seen in FIG. 3, equal to the sum of the tension $T_0$ of the belt 9 when the given accessory 11 and the engine 2 are both at rest, the tension $T_{ISG2}$ of the belt 9, as developed by torque output from the given accessory pulley 11, and the tension $T_{ine}$ of the belt 9, as created by the inertia of the first tensioner pulley 21 when it starts to be rotated suddenly by the given accessory pulley 5 after being stopped. Between the start of the drive shaft 3 (i.e., time t4) and the start of the engine 2 (i.e., time t5), the degree of tension of the belt 9 on the first tensioner pulley 21 is, as can be seen in FIG. 3, equal to the sum of the tension $T_0$ of the belt 9 when the given accessory 11 and the engine 2 are both at rest, the tension $T_{ISG2}$ of the belt 9, as developed by torque output from the given accessory pulley 11, and the tension $T_{eng}$ of the belt 9, as created by the inertia of the engine 2 (i.e., the drive shaft 3 and the driving pulley 4) when it starts to be rotated suddenly by the given accessory pulley 5 after the engine 2 is stopped. It indicates that the power transmission system 1 is capable of reducing the degree of tension of the belt 9 on the first tensioner pulley 21 by the tension $T_{ine}$ or $T_{eng}$ after time t2 when the start request is made to start the engine 2.

In the comparative example, the given accessory 11 is at rest at time t2 when the start request is made to start the engine 2, thus leading to the possibility of a lag in producing the field current in the given accessory 11 which will result in a delay in actuating the given accessory 11 in the motor mode, but the power transmission system 1 eliminates such a problem.

(1) As apparent from the above discussion, the power transmission system 1 of this embodiment has the driving pulley 4 joined to the drive shaft 3 of the engine 2 to be rotatable along with the drive shaft 3. The given accessory pulley 5 is attached to the shaft 12 of the given accessory 11 which is operable either in the motor mode or the regenerative mode so that it is rotatable along with the shaft 12. The accessory pulleys 6, 7, and 8 are attached to the shafts 14, 16, and 18 of the accessories 13, 15, and 17 to be rotatable along with the shafts 14, 15, and 18.

The belt 9 is wound around the driving pulley 4, the given accessory pulley 5, and the accessory pulleys 6, 7, and 8 to transmit torque of each of the pulleys 4, 6, 7, and 8 to another. The first auto-tensioner 20 has the first tensioner pulley 21 which is swingable in contact with the belt 9 between the driving pulley 4 and the given accessory pulley 5 and also movable relative to the engine 2. The relative movement of the first tensioner pulley 21 to the engine 2 regulates the degree of tension of the belt 9. The first auto-tensioner 20 serves to eliminate the loosening of the belt 9 between the driving pulley 4 and the given accessory pulley 5 when the given accessory 11 starts to operate in the regenerative mode. The ECU 70 works to control the operation of the given accessory 11.

Prior to the issuing of the start request to start the engine 2, the ECU 70 actuates the given accessory 11 in the motor mode to move the first tensioner pulley 21 to the given position. Upon the issuing of the start request for the engine 2, the first tensioner pulley 21, thus, lies at the given position, so that the degree of tension of the belt 9 between the driving pulley 4 and the given accessory pulley 5 is higher than or equal to the required value. The actuation of the given accessory 11 as the starter in the motor mode to produce torque great enough for cranking the engine 2 upon the issuing of the start request for the engine 2, therefore, enables the drive shaft 3 to be rotated immediately within a required period of time to crank the engine 2. This results in a decrease in amount of time between the issuing of the start request for the engine 2 and the start of the engine 2 as compared with the above described comparative example of the power transmission system.

Upon the issuing of the start request for the engine 2, a difference in circumferential speed among the given accessory pulley 5, the driving pulley 4, and the first tensioner pulley 21 is, as described above, lowed, thus avoiding an increase in degree of the tension of the belt 9 which will arise from the inertia of the driving pulley 4 and the first tensioner pulley 21, as developed when they rotated suddenly by the given accessory pulley 5 after being stopped or when rotating at a low speed.

The given accessory 11 is, as described above, operating upon the issuing of the start request for the engine 2, thereby eliminating a lag in producing a field current in the given accessory 11 which will result in a delay in starting the given accessory 11 in the motor mode.

(2) The given position to which the first tension pulley 21 is moved before the issuing of the start request to start the engine 2 is the limit of the relative movable range of the first tensioner pulley 21. Therefore, when the given accessory 11 is actuated in the motor mode upon the issuing of the start request, the drive shaft 3 will be immediately rotated to crank the engine 2, thus resulting in a great shortening of time between the issuing of the start request and the actual start of the engine 2.

(3) The power transmission system 1, as described above, has the second tensioner pulley 31 which is disposed to be rotatable in contact with the belt 9 on the opposite side of the given accessory pulley 5 to the first tensioner pulley 21 and also movable relative to the engine 2. The power transmission system 1 also has the second auto-tensioner 30 which works to move the second tensioner pulley 31 relative to the engine 2 for regulating or increasing the degree of tension of the belt 9, thereby eliminating the loosening of the belt 9, as occurring on the opposite side of the given accessory pulley 5 to the first tensioner pulley 21 when the given accessory 11 operates in the motor mode.

Second Embodiment

Figure 4:
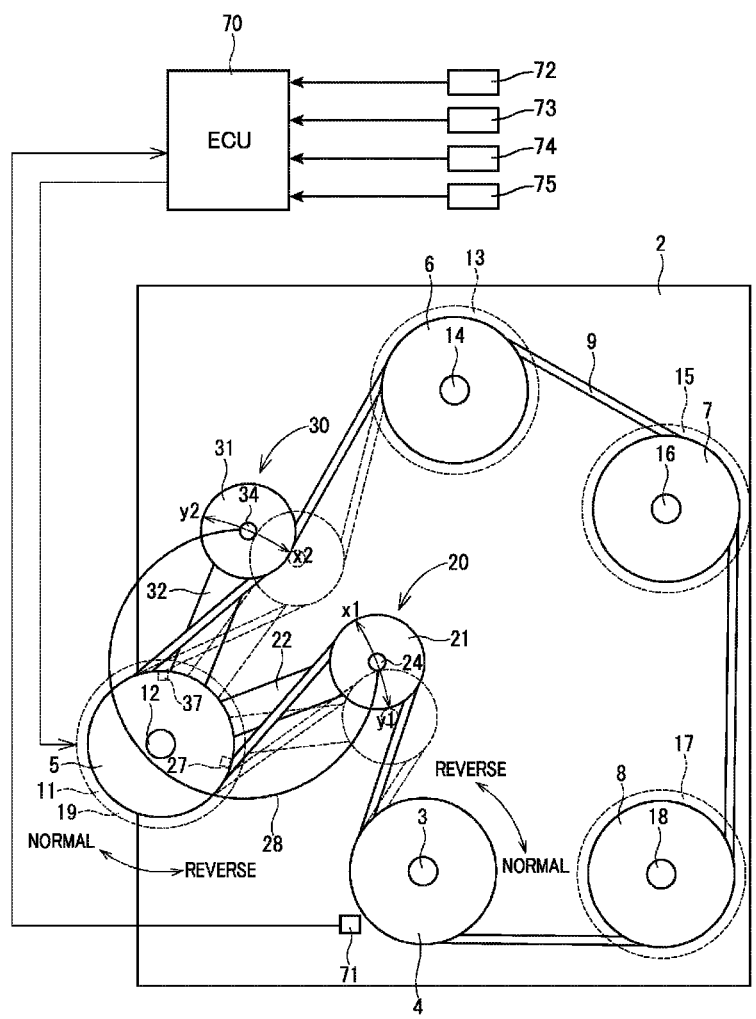
FIG. 4 is a schematic view which illustrates a power transmission system according to the second embodiment.

FIG. 4 illustrates the power transmission system 1 according to the second embodiment which is different only in structure of the first auto-tensioner 20 and the second auto-tensioner 30 from the first embodiment.

The first auto-tensioner 20 has the arms 22 whose end is borne by the shaft 12, so that the arm 22 is movable or swingable about the shaft 12 relative to the engine 2.

Similarly, the second auto-tensioner 30 has the arm 32 whose end is borne by the shaft 12, so that the arm 32 is movable or swingable about the shaft 12 relative to the engine 2.

The power transmission system 1 also includes a spring 28 which is connected at an end thereof to the shaft 24 of the first auto-tensioner 20 and at the other end to the shaft 34 of the second auto-tensioner 30. The spring 28 works as a biasing mechanism to urge the shafts 24 and 34 in a direction in which the shafts 24 and 34 approach each other. Specifically, the first tensioner pulley 21 and the second tensioner pulley 31 are biased by the spring 28 in the directions x1 and x2 so that they are moved closer to each other for increasing the degree of tension of the belt 9.

The stoppers 27 and 37 are secured to the housing 19 of the given accessory 11. The stopper 27 works to hold the arm 22 (i.e., the first tensioner pulley 21) from moving further in the direction y1 when the end of the arm 22 contacts with the stopper 27. Similarly, the stopper 37 works to hold the arm 32 (i.e., the second tensioner pulley 31) from moving further in the direction y2 when the end of the arm 32 contacts with the stopper 37.

Other arrangements of the power transmissions system 1 and the operation of the ECU 70 are the same as those in the first embodiment. The second embodiment, like in the first embodiment, provides the beneficial advantage that shortens the time required between the issuing of the start request for the engine 2 and the actual start of the engine 2.

The ECU 70, like in the first embodiment, actuates the given accessory 11 in the motor mode to bring the first tensioner pulley 21 to the given position prior to the issuing of the start request for the engine 2, but the given position in this embodiment is the limit of the relative movable range of the first tensioner pulley 21, in other words, where a portion of the end of the arm 22 contacts the stopper 27.

Third Embodiment

Figure 5:
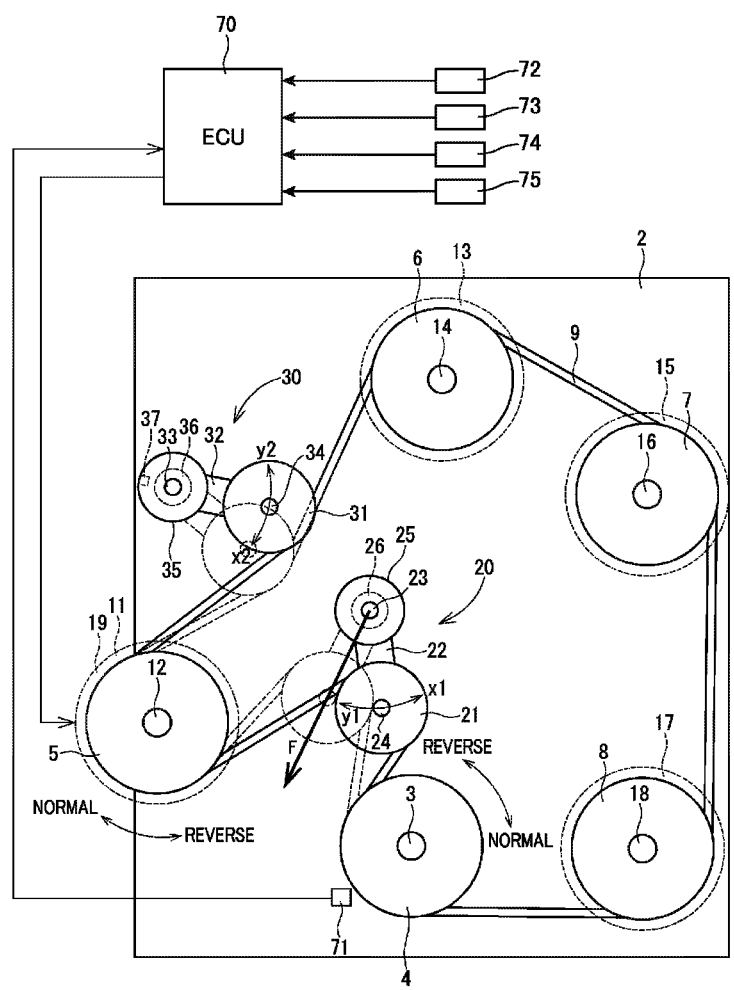
FIG. 5 is a schematic view which illustrates a power transmission system according to the third embodiment.

FIG. 5 illustrates the power transmission system 1 according to the third embodiment which is different only in structure of the first auto-tensioner 20 from the first embodiment.

Specifically, the base 25 of the first auto-tensioner 20 is different in location of installation thereof from the first embodiment. Additionally, the first auto-tensioner 20 does not have the stopper 27.

In operation of the power transmissions system 1 of this embodiment, the ECU 70 actuates the given accessory 11 in the motor mode when the engine 2 is being stopped, so that the degree of tension of the belt 9 increases. This causes the arm 22 and the first tensioner pulley 21 to be swung in the direction y1 against the pressure, as produced by the spring 26, until it reaches the given position. When a direction in which force F, as exerted by the belt 9 on the first tensioner pulley 21 (i.e., the shaft 24), coincides with the length (i.e., the longitudinal center line) of the arm 22, the arm 22 and the first tensioner pulley 21 are stopped from being swung. This holds the arm 22 and the first tensioner pulley 21 from moving over the above described given position in the direction y1, thus eliminating the need for the stopper 27 used in the first embodiment.

Other arrangements of the power transmissions system 1 and the operation of the ECU 70 are the same as those in the first embodiment. The structure of the power transmission system 1 of the third embodiment, thus, permits a total number of parts thereof or the number of steps of machining the parts to be decreased and also offers, like the first embodiment, the beneficial advantage that shortens the time required between the issuing of the start request for the engine 2 and the actual start of the engine 2.

The ECU 70, like in the first embodiment, actuates the given accessory 11 in the motor mode to bring the first tensioner pulley 21 to the given position prior to the issuing of the start request for the engine 2, but the given position in this embodiment is the limit of the relative movable range of the first tensioner pulley 21, in other words, where the direction in which force F, as exerted by the belt 9 on the first tensioner pulley 21 (i.e., the shaft 24), coincides with the length (i.e., the longitudinal center line) of the arm 22.

Fourth Embodiment

Figure 6:
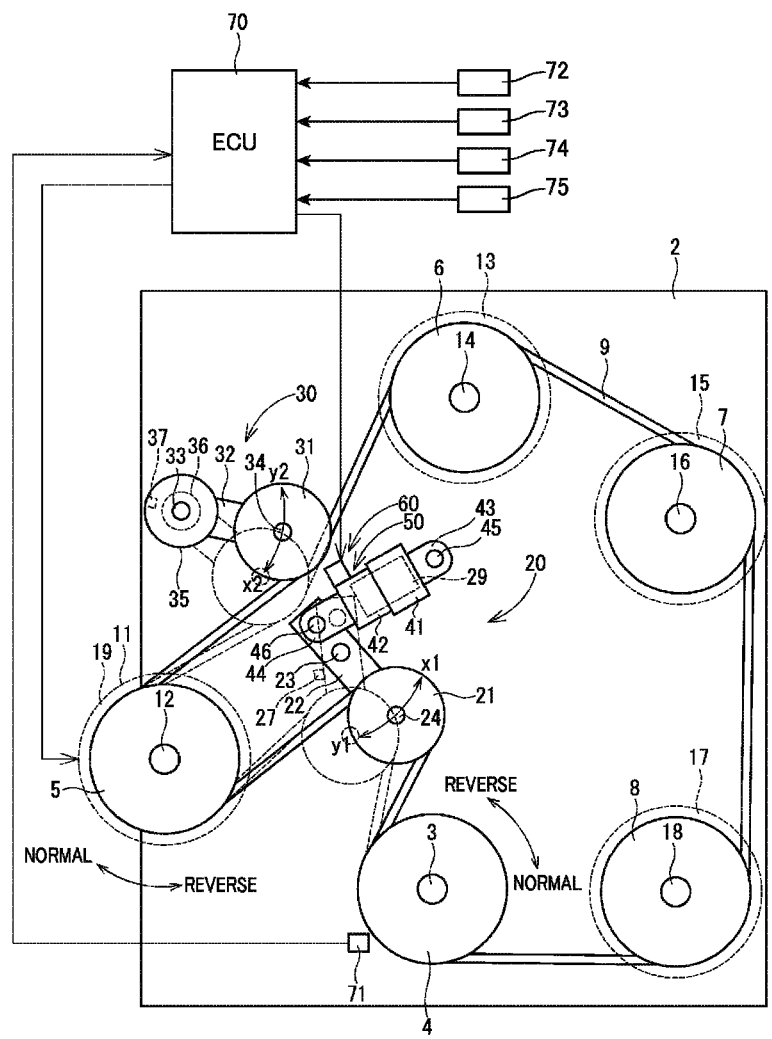
FIG. 6 is a schematic view which illustrates a power transmission system according to the fourth embodiment.

FIG. 6 illustrates the power transmission system 1 according to the fourth embodiment which is different only in structure of the first auto-tensioner 20 from the first embodiment.

Figure 7:
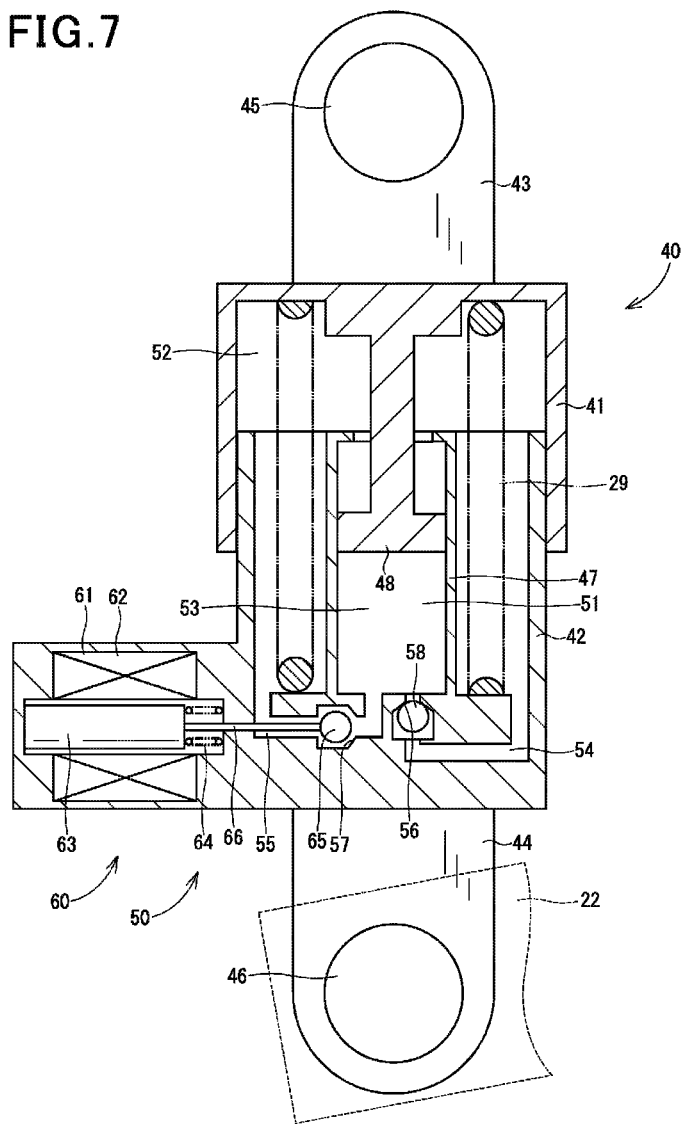
FIG. 7 is a longitudinal sectional view which illustrates a tensioner body installed in the power transmission system of FIG. 6.

The first auto-tensioner 20 includes, as clearly illustrated in FIGS. 6 and 7, the first tensioner pulley 21, the arm 22, the shafts 23 and 24, the coil spring 29, the tensioner body 40, and the position holding mechanism 50.

The shaft 24 is secured to the wall surface of the engine 2 and bears a central portion of the arm 22, so that the arm 22 is rotatable about the shaft 23 either in the direction x1 or in the direction y1 relative to the engine 2.

The tensioner body 40, as clearly illustrated in FIG. 7, includes an upper body 41, a lower body 42, extensions 43 and 44, shafts 45 and 46, a hollow cylinder 47, and a piston 48.

The upper body 41 is in the shape of a hollow cylinder with a bottom. Similarly, the lower body 42 is in the shape of a hollow cylinder with a bottom. The lower body 42 has an open end which faces the bottom thereof and is disposed inside the upper body 41. Specifically, the lower body 42 is arranged in slidable contact at an outer wall of the open end thereof with an inner wall of the upper body 41, so that it is movable in an axial direction of the upper body 41. The extension 43 extends from the bottom of the upper body 41 away from the lower body 42. The extension 44 extends from the bottom of the lower body 42 away from the upper body 41.

The shaft 45 is secured at an end thereof to the wall surface of the engine 2 and bears at the other end thereof an end of the extension 43 farther away from the upper body 41, so that the tensioner body 40 is swingable about the shaft 45 relative to the engine 2. Similarly, the shaft 46 is secured at an end thereof to an end of the extension 44 which is farther away from the lower body 42 and rotatably bears an end of the arm 22 which is farther away from the first tensioner pulley 21. When the upper body 41 and the lower body 42 are moved relative to each other, so that the tensioner body 40 extends or contracts in the axial direction thereof, it will cause the arm 22 to turn about the shaft 23 to change the location of the first tensioner pulley 21 relative to the engine 2, thereby changing the degree of tension of the belt 9 between the driving pulley 4 and the given accessory pulley 5.

The cylinder 47 is formed in the lower body 42 and extends from the bottom of the lower body 42 toward the upper body 41. The cylinder 47 may be formed integrally with the lower body 42. The piston 48 is formed in the upper body 41 and extends from the bottom of the upper body 41 toward the lower body 42. The piston 48 may be formed integrally with the upper body 41. The piston 48 has a head which is formed on an end thereof farther away from the bottom of the upper body 41. The head of the piston 48 has an outer periphery placed in slidable contact with an inner wall of the cylinder 47. When the upper body 41 and the lower body 42 move relative to each other, the piston 48 and the cylinder 47 slide relative to each other.

The coil spring 29 works as a biasing mechanism and is disposed inside the upper body 41 and the lower body 42. The coil spring 29 has ends placed in contact with the bottoms of the upper body 41 and the lower body 42, respectively. The coil spring 29 is compressed to produce pressure which urges the upper and lower bodies 41 and 42 away from each other. Specifically, the coil spring 29 works to push, i.e., rotate the arm 22 about the shaft 23 in the direction x1 (i.e., the counterclockwise direction, as viewed in FIG. 6) so as to bias the first tensioner pulley 21 for increasing the degree of tension of the belt 9 between the driving pulley 4 and the given accessory pulley 5.

The position holding mechanism 50 includes a first fluid chamber 51, a second fluid chamber 52, fluid 53, connecting paths 54 and 55, seats 56 and 57, a valve ball 58, and a control valve 60.

The first fluid chamber 51 is defined by the bottom of the lower body 42 and the piston 48 within the cylinder 47 of the lower body 42. The first fluid chamber 51 has a volume which decreases with the contraction of the tensioner body 40 and increases with the expansion of the tensioner body 40.

The second fluid chamber 52 is defined by an inner wall of the lower body 42, an outer wall of the cylinder 47, and an inner wall of the upper body 41.

The fluid 53 is, for example, oil or gas and occupies the first fluid chamber 51 and the second fluid chamber 52.

The connecting paths 54 and 55 are formed in the bottom of the lower body 42 and connect between the first fluid chamber 51 and the second fluid chamber 52. When the tensioner body 40 contracts or expands in the axial direction thereof, the volume of the first fluid chamber 51 changes, thus causing the fluid 53 to flow between the first fluid chamber 51 and the second fluid chamber 52 through the connecting path 57 or 58.

The seat 56 is formed on an inner wall of the connecting path 54 and tapers toward the first fluid chamber 51. The seat 57 is formed on an inner wall of the connecting path 55 and tapers toward the first fluid chamber 51.

The valve ball 58 is of a spherical shape and disposed in the connecting path 54 so that it selectively rests on or leaves the seat 56. Specifically, when the tensioner body 40 expands, it will urge the fluid 53 to flow from the second fluid chamber 52 to the first fluid chamber 51 through the connecting path 54, thereby pressing the valve ball 58 into abutment with the seat 56 to block fluid communication between the first fluid chamber 51 and the second fluid chamber 52 through the connecting path 54. Alternatively, when the tensioner body 40 contracts, it will urge the fluid 53 to flow from the first fluid chamber 51 to the second fluid chamber 52 through the connecting path 54, thereby moving the valve ball 58 away from the seat 56 to establish the fluid communication between the first fluid chamber 51 and the second fluid chamber 52 through the connecting path 54.

The control valve 60 is installed in the lower body 42 of the tensioner body 40. The control valve 60 includes a stator 61, a coil 62, a movable stem 63, a spring 64, a valve ball 65, and a connecting rod 66.

The stator 61 is of a cylindrical shape and made from metal such as iron. The stator 61 is disposed near the bottom of the lower cylinder 42 and has an axis aligned with the length of a major part of the connecting path 55. The coil 62 is wound around the stator 61. The movable stem 63 is of a cylindrical shape and made from metal such as iron. The movable stem 63 is disposed inside the stator 61 to be reciprocable in an axial direction thereof. The spring 64 is made of, for example, a coil spring and installed on an end of the movable stem 63 which faces the lower body 42. The spring 64 works to urge the movable stem 63 away from the lower body 42. The valve ball 65 is of a spherical shape and disposed in the connecting path 55 so that it selectively rests on or leaves the seat 57. The connecting rod 66 joints the movable stem 63 and the valve ball 65 together so as to keep a positional relation therebetween as it is. When the movable stem 63 is urged by the spring 64 away from the lower body 42 (i.e. in the left direction, as viewed in FIG. 7), the valve ball 65 is separate from the seat 57 to establish fluid communication between the first fluid chamber 51 and the second fluid chamber 52.

In operation, when the coil 62 is supplied with electric power so that it is energized, it will create a flow of magnetic flux through the stator 61 and the movable stem 63, thereby magnetically attracting the movable stem 63 to the spring 64 (i.e., the lower body 42) against the pressure, as produced by the spring 64. This causes the valve ball 65 to rest on the seat 57 to block the fluid communication between the first fluid chamber 51 and the second fluid chamber 52 through the connecting path 55. Alternatively, when the coil 62 is deenergized, the magnetic flux will disappear from the stator 61 and the movable stem 63, thereby moving the movable stem 63 away from the lower body 42 with aid of the pressure, as produced by the spring 64. This causes the valve ball 65 to be moved away from the seat 57 to establish the fluid communication between the first fluid chamber 51 and the second fluid chamber 52 through the connecting path 55.

When the coil 62 is energized, so that the valve ball 65 rests on the seat 57, the flow of the fluid 53 from the second fluid chamber 52 to the first fluid chamber 51 is blocked by both the valve balls 58 and 65, but the fluid 53 is permitted to flow from the first fluid chamber 51 to the second fluid chamber 52 through the connecting path 54. This stops the tensioner body 40 from expanding, but permits the tensioner body 40 to contract.

Alternatively, when the coil 62 is in the deenergized state, so that the valve ball 65 is separate from the seat 57, the flow of the fluid 53 from the second fluid chamber 52 to the first fluid chamber 51 through the connecting path 54 is blocked by the valve ball 58, but the fluid 53 is permitted to flow from the first fluid chamber 51 to the second fluid chamber 52 or vice versa through the connecting path 55. This permits the tensioner body 40 to selectively expand and contract.

The control valve 60, as apparent from the above discussion, works as an expansion inhibitor to block the fluid communication between the first fluid chamber 51 and the second fluid chamber 52 through the energization of the coil 62 to inhibit the tensioner body 40 from expanding.

The tensioner body 40 is, as described above, capable of expanding or contracting in the axial direction thereof to swing the first tensioner pulley 21 relative to the engine 2 to change the degree of tension of the belt 9. The spring 29 works to urge the tensioner body 40 to expand in the axial direction thereof. The position holding mechanism 50 serves as the expansion inhibitor selectively to stop the tensioner body 40 from expanding.

The first auto-tensioner 20 has the first tensioner pulley 21 swung by the extension or contraction of the tensioner body 40 relative to the engine 2, thereby regulating the degree of tension of the belt 9. Specifically, the first auto-tensioner 20 works to eliminate the loosening of the belt 9 between the driving pulley 4 and the given accessory pulley 5 in the regenerative mode of operation of the given accessory 11.

The stopper 27 is secured to the wall surface of the engine 2 near the shaft 23. When the arm 22 rotates in the direction y1 relative to the engine 2, a portion of the arm 22 near the shaft 23 hits the stopper 27, thereby stopping the arm 22 from rotating further in the direction y1. Specifically, the stopper 27 serves to inhibit the arm 22 and the first tensioner pulley 21 from rotating over the given position in the direction y1. The given position is the limit of the relative movable range of the first tensioner pulley 21.

When the first tensioner pulley 21 lies at the given position, the position holding mechanism 50 is capable of stopping the tensioner body 40 from expanding to hold the first tensioner pulley 21 at the above given position.

Prior to the issuing of the start request for the engine 2, the ECU 70 operates the given accessory 11 in the motor mode to bring the first tensioner pulley 21 to the given position where the arm 22 contacts the stopper 27. Specifically, when the give accessory 11 operates in the motor mode, it increases the degree of tension of the belt 9 between the driving pulley 4 and the given accessory pulley 5, so that the arm 22 (i.e., the first tensioner pulley 21) rotates in the direction y1 against the pressure, as produced by the spring 29. This causes the tensioner body 40 to contract to move the first tensioner pulley 21 to the given position. When the first tensioner pulley 21 reaches the given position, the ECU 70 turns on the control valve 60 to stop the tensioner body 40 from expanding, thereby holding the first tensioner pulley 21 from returning from the given position in the direction x1 when the given accessory 11 is stopped.

The operation of the power transmission system 1 of this embodiment will be described below with reference to FIG. 8.

In the illustrated example, the stop condition for the engine 2 has been met before time t0. The speed of the engine 2 has already decreased to zero at time t0.

At time t1 after a lapse of a given time since the stop condition for the engine 2 was met, the ECU 70 starts the given accessory 11 in the motor mode. Specifically, the ECU 70 controls the operation of the given accessory 11 in the motor mode, that is, rotates the given accessory 11 in the normal direction so as to produce a degree of torque which will move the first tensioner pulley 21 in the direction y1. This causes the tension of the belt 9 between the driving pulley 4 and the given accessory pulley 5 to increase, so that the first tensioner pulley 21, as illustrated in FIG. 6, moves or swings in the direction y1 against the pressure produced by the spring 29. Upon the start of rotation of the given accessory 11, the degree of tension of the belt 9 on the first tensioner pulley 21 is, as can be seen in FIG. 8, equal to the sum of a tension $T_0$ of the belt 9 when the given accessory 11 and the engine 2 are both at rest, a tension $T_{ISG1}$ of the belt 9, as developed by torque output from the given accessory pulley 11, and a tension $T_{ine}$ of the belt 9, as created by the inertia of the first tensioner pulley 21 when it starts to be rotated suddenly by the given accessory pulley 5 after being stopped.

After time t1, the given accessory 1 continues to operate in the motor mode, thereby bringing the arm 22 into contact with the stopper 27 at time t2. The first tensioner pulley 21, thus, lies at the given position that is, as described above, the limit of the relative movable range thereof. The swing angle of the first auto-tensioner 20 that is, as described in FIG. 3, an angle of arm 22 relative to the engine 2 will be the stopper angle when the arm 22 contacts the stopper 27. When the engine 2 is at rest, the swing angle of the first auto-tensioner 20 is defined to be zero.

When the first tensioner pulley 21 reaches the given position at time t2, the ECU 70 turns on the control valve 60 to stop the tensioner body 40 from expanding, thereby keeping the swing angle of the first auto-tensioner 20 at the stopper angle after time t2, so that the first tensioner pulley 21 is held at the given position.

At time t3, the ECU 70 stops the operation of the given accessory 11 in the motor mode. The control valve 60 has already stopped the tensioner body 40 from expanding, so that the first tensioner pulley 21 is held at the given position when the given accessory 11 is stopped.

When the engine start condition is met, so that the start request for the engine 2 is made at time t4, the ECU 70 actuates the given accessory 11 as the starter in the motor mode to output a degree of torque great enough to crank the engine 2. At this time, the first tensioner pulley 21 lies at the limit of the relative movable range, so that the tension of the belt 9 between the driving pulley 4 and the given accessory pulley 5 is above a required value. Accordingly, when the ECU 70 actuates the given accessory 11 as the starter at time t4, it immediately rotates the drive shaft 3 (i.e., the driving pulley 4) to crank the engine 2, so that the engine 2 starts at time t5. In this example, the degree of torque outputted from the given accessory 11 after time t4 is higher than that outputted therefrom between time t1 to time t3. When the engine 2 has started at time t5, the ECU 70 turns off the control valve 60.

Figure 8:
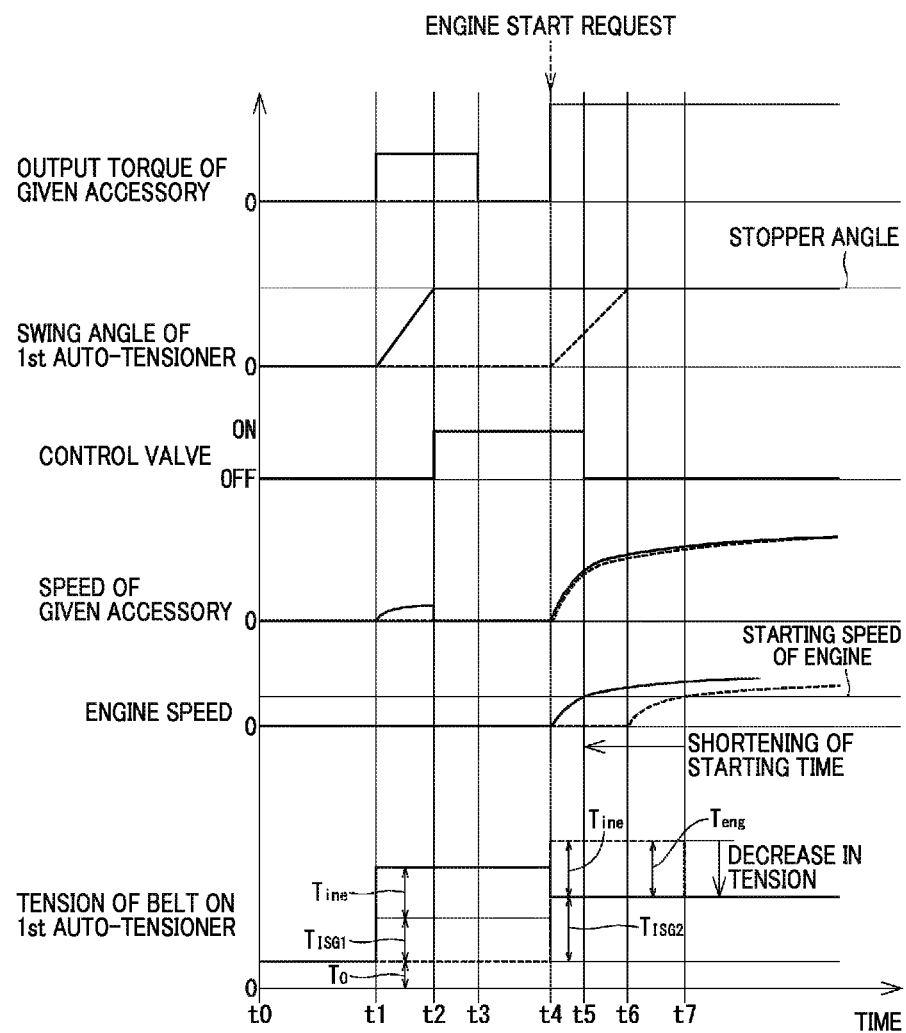
FIG. 8 is a time chart which demonstrates operations of the power transmission system of FIG. 7.

After time t4, the degree of tension of the belt 9 on the first tensioner pulley 21 will be equal to, as can be seen in FIG. 8, the sum of the tension $T_0$ of the belt 9 when the given accessory 11 and the engine 2 are both at rest and a tension $T_{ISG2}$ of the belt 9, as developed by torque output from the given accessory pulley 11. Specifically, after time t4, a difference in circumferential speed among the given accessory pulley 5, the driving pulley 4, and the first tensioner pulley 21 is decreased, thereby eliminating a component of the tension of the belt 9 which will arise from the inertia of the driving pulley 4 and the first tensioner pulley 21, as developed when they start to be rotated suddenly by the given accessory pulley 5 after they are stopped.

Broken lines in FIG. 8 demonstrate the operations of the power transmission system, as already described as a comparative example in FIG. 3.

The power transmission system consumes a relatively long period of time between time t4 when the start request for the engine 2 is made and time t7 when the engine 2 starts operating, while the power transmission system 1 of this embodiment enables the engine 2 to be started at time t5 within a relatively short period of time since the start request for the engine 2 was made at time t4.

Between time t4 when the given accessory 11 starts operating in the motor mode in response to the start request for the engine 2 and time t6 when the drive shaft 3 starts rotating, the degree of tension of the belt 9 on the first tensioner pulley 21 is, as can be seen in FIG. 8, equal to the sum of the tension $T_0$ of the belt 9 when the given accessory 11 and the engine 2 are both at rest, the tension $T_{ISG2}$ of the belt 9, as developed by torque output from the given accessory pulley 11, and the tension $T_{ine}$ of the belt 9, as created by the inertia of the first tensioner pulley 21 when it starts to be rotated suddenly by the given accessory pulley 5 after being stopped. Between time t6 when the drive shaft 3 starts rotating and time t7 when the engine 2 starts operating, the degree of tension of the belt 9 on the first tensioner pulley 21 is, as can be seen in FIG. 8, equal to the sum of the tension $T_0$ of the belt 9 when the given accessory 11 and the engine 2 are both at rest, the tension $T_{ISG2}$ of the belt 9, as developed by torque output from the given accessory pulley 11, and the tension $T_{eng}$ of the belt 9, as created by the inertia of the engine 2 (i.e., the drive shaft 3 and the driving pulley 4) when it starts to be rotated suddenly by the given accessory pulley 5 after the engine 2 is stopped. It indicates that the power transmission system 1 is capable of reducing the degree of tension of the belt 9 on the first tensioner pulley 21 by the tension $T_{ine}$ or $T_{eng}$ after time t4 when the start request is made to start the engine 2.

When the given accessory 11 is stopped in the motor mode at time t3, the position holding 50, as described above, has already turned on the control valve 60 to hold the first tensioner pulley 21 at the above given position. This permits a time interval between the issuing of the start request for the engine 2 and the start of the engine 2 to be shortened without increasing the amount of power consumed by the given accessory 11.

(4) As apparent from the above discussion, the power transmission system 1 of this embodiment has the position holding mechanism 50 which works to hold the first tensioner pulley 21 at the given position to which the first tensioner pulley 21 is moved by the given accessory 11 operated in the motor mode by the ECU 70.

(5) The first auto-tensioner 20 includes the tensioner body 40 and the spring 29. The tensioner body 40 is expandable or contractable in the axial direction thereof to move the first tensioner pulley 21 relative to the engine 2. The spring 29 serves as a biasing mechanism to bias the tensioner body 40 to extend in the axial direction.

The position holding mechanism 50 is installed in the tensioner body 40 and includes the first fluid chamber 51, the second fluid chamber 52, the fluid 53, and the control valve 60. The first fluid chamber 51 has a volume which decreases with the contraction of the tensioner body 40 and increases with the extension of the tensioner body 40. The second fluid chamber 52 is formed in the tensioner body 40 in fluid communication with the first fluid chamber 51. The fluid 53 is disposed within the first and second fluid chambers 51 and 52. The control valve 60 is responsive to the on-signal from the ECU 70 to establish or block the fluid communication between the first fluid chamber 51 and the second fluid chamber 52.

The position holding mechanism 50 is responsive to the control signal from the ECU 70 to control the operation of the control valve 60 so as to block the fluid communication between the first fluid chamber 51 and the second fluid chamber 52 in order to inhibit the tensioner body 40 from expanding. This causes the first tensioner pulley 21 to be held at the above described given position (i.e., the limit of the relative movable range) for minimizing the amount of electric power consumed by the given accessory 11.

The fourth embodiment exemplifies the structures of the first auto-tensioner 20 and the position holding mechanism 50.

Fifth Embodiment

Figure 9:
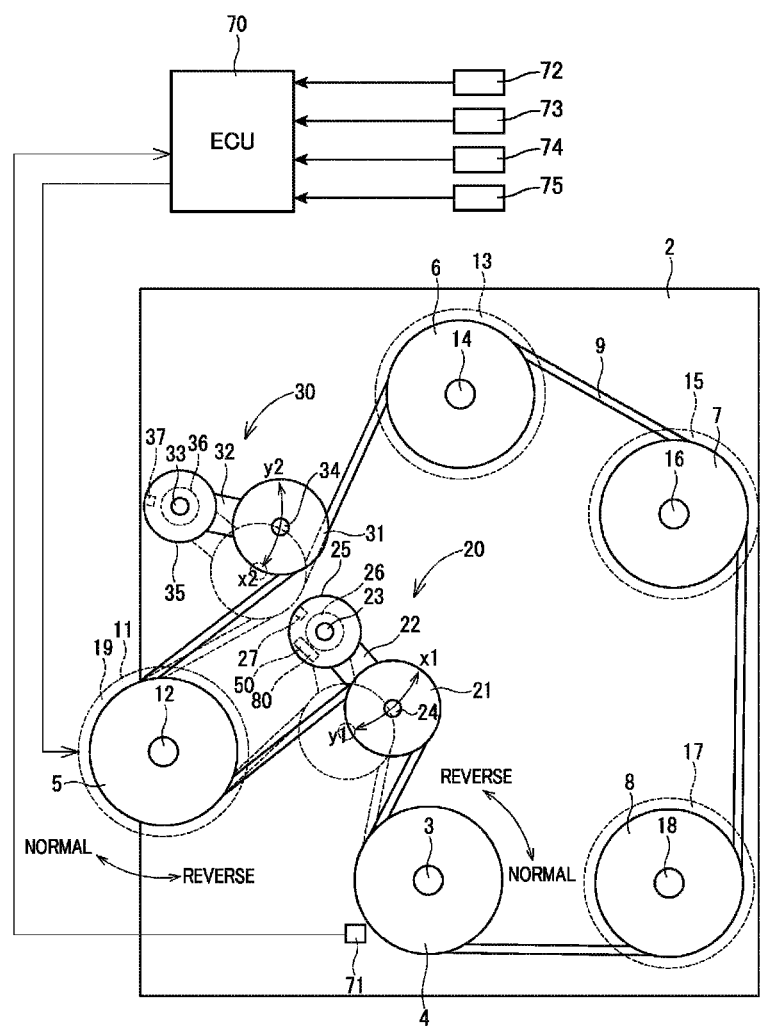
FIG. 9 is a schematic view which illustrates a power transmission system according to the fifth embodiment.

FIG. 9 illustrates the power transmission system 1 according to the fifth embodiment which is different in structure around the first auto-tensioner 20 from the first embodiment.

The first auto-tensioner 20 includes, as clearly illustrated in FIG. 9, the first tensioner pulley 21, the arm 22, the shafts 23 and 24, the base 25, the coil spring 26, and the position holding mechanism 50.

The position holding mechanism 50 is equipped with a resistance generator 80 which is disposed between the end of the arm 22 and the base 25. The resistance generator 80 is made up of two frictional plates placed in contact with each other to develop a constant degree of mechanical resistance. One of the frictional plates is joined to the arm 22. The other frictional plate is secured to the base 25. The resistance generator 80 works to produce the mechanical resistance between the arm 22 and the base 25 in response to relative rotation of the arm 22 and the base 25. Specifically, the resistance generator 80 produces the resistance to the swinging motion of the arm 22 about the base 24, thereby eliminating or minimizing a change in position of the arm 22 relative to the engine 2 when the first tensioner pulley 21 is urged either in the direction x1 or the direction y1.

Specifically, when the first tensioner pulley 21 reaches the given position where the arm 22 contacts the stopper 27, the resistance, as produced by the position holding mechanism 50 (i.e., the resistance generator 80), serves to hold the first tensioner pulley 21 at or near the given position.

Prior to the issuing of the start request for the engine 2, the ECU 70 operates the given accessory 11 in the motor mode to bring the first tensioner pulley 21 to the given position where the arm 22 contacts the stopper 27. When the first tensioner pulley 21 reaches the given position, the ECU 70 stops operating the given accessory 11 in the motor mode. The position holding mechanism 50 (i.e., the resistance generator 80), as described above, holds the first tensioner pulley 21 at or near the given position, that is, stops the first tensioner pulley 21 from swinging in the direction x1 or y1 after the given accessory 11 is stopped.

The operation of the power transmission system 1 of this embodiment will be described below with reference to FIG. 10.

Figure 10:
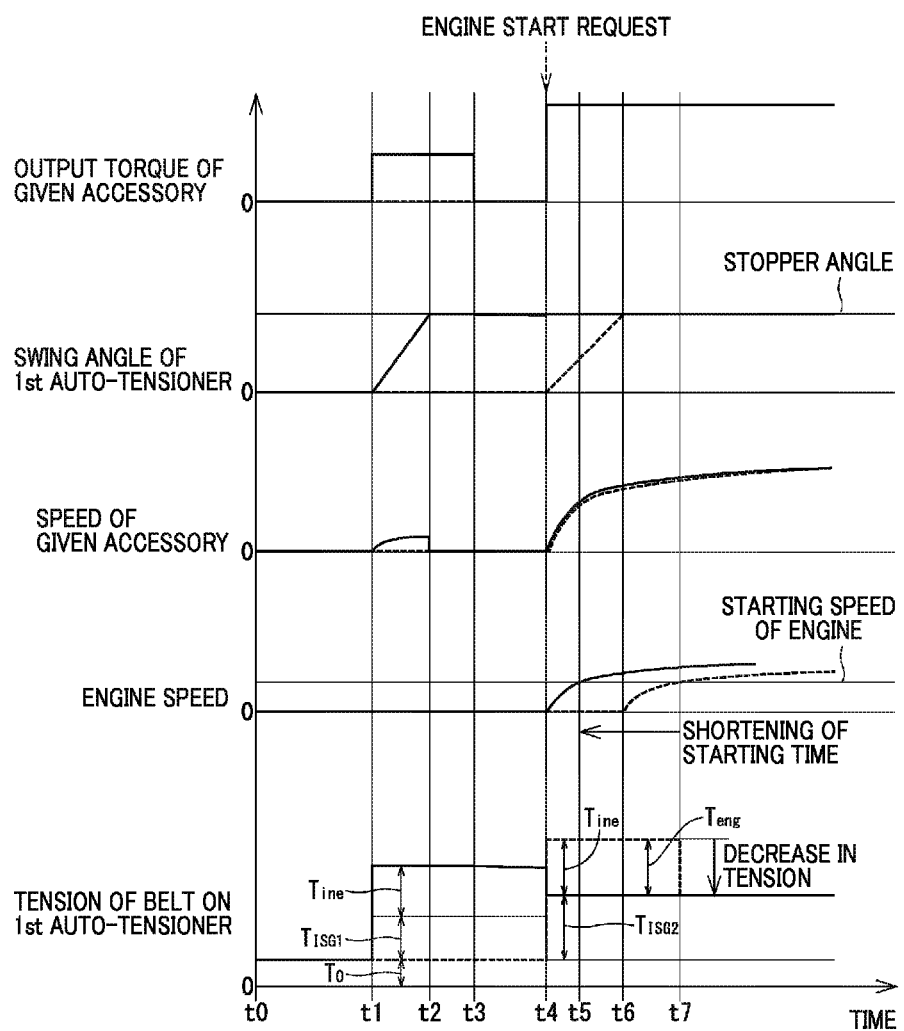
FIG. 10 is a time chart which demonstrates operations of the power transmission system of FIG. 9.

Solid lines in FIG. 10 represent operations of the components of the power transmission system 1 of the fifth embodiment. Broken lines demonstrate the operations of the power transmission system, as already described as a comparative example in FIG. 3.

At time t1 after a lapse of a given time since the stop condition for the engine 2 was met, the ECU 70 starts the given accessory 11 in the motor mode. Specifically, the ECU 70 controls the operation of the given accessory 11 in the motor mode, that is, rotates the given accessory 11 in the normal direction so as to produce a degree of torque which will move the first tensioner pulley 21 in the direction y1. This results in an increase in tension of the belt 9 between the driving pulley 4 and the given accessory pulley 5, thus causing the first tensioner pulley 21 to move or swing, as illustrated in FIG. 9, in the direction y1 against the pressure produced by the spring 26.

After time t1, the given accessory 1 continues to operate in the motor mode, so that the arm 22 is brought into contact with the stopper 27 at time t2. The first tensioner pulley 21, thus, lies at the given position that is, as described above, the limit of the relative movable range thereof. The swing angle of the first auto-tensioner 20 that is, as described in FIG. 3, an angle of arm 22 relative to the engine 2 will be the stopper angle when the arm 22 contacts the stopper 27.

At time t3, the ECU 70 stops the operation of the given accessory 11 in the motor mode. The position holding mechanism 50 (i.e., the resistance generator 80) continues to hold the first tensioner pulley 21 at or near the given position, thereby stopping the first tensioner pulley 21 from swinging further, that is, keeping the swing angle of the first tensioner pulley 21 at the stopper angle after time t3 when the given accessory 11 is stopped.

When the engine start condition is met, so that the start request for the engine 2 is made at time t4, the ECU 70 actuates the given accessory 11 as the starter in the motor mode to output a degree of torque great enough to crank the engine 2. At this time, the first tensioner pulley 21 lies at the limit of the relative movable range, so that the tension of the belt 9 between the driving pulley 4 and the given accessory pulley 5 is above a required value. Accordingly, when the ECU 70 actuates the given accessory 11 as the starter at time t4, it immediately rotates the drive shaft 3 (i.e., the driving pulley 4) to crank the engine 2, so that the engine 2 starts at time t5.

The power transmission system 1 is, therefore, capable of starting the engine 2 at time t5 within a relatively short period of time since the start request for the engine 2 was made at time t4, as compared with the power transmission system, as indicated by the broken lines in FIG. 10, and, after time t4, eliminating a component of the tension of the belt 9 which will arise from the inertia of the driving pulley 4 and the first tensioner pulley 21, as developed when they start to be rotated suddenly by the given accessory pulley 5 after they are stopped.

(6) The first auto-tensioner 20 is equipped with the arm 22 which supports the first tensioner pulley 21 to be rotatable and is secured to be movable or swingable relative to the engine 2. The position holding mechanism 50 is equipped with the resistance generator 80 which produces the resistance to the swinging motion of the arm 22 relative to the engine 2, to thereby eliminate or minimize a change in position of the arm 22 relative to the engine 2. Specifically, the resistance generator 80 mechanically continues to develop the resistance to hold the first tensioner pulley 21 at or near the given position after the given accessory 11 is stopped in the motor mode, thus permitting the time interval between the issuing of the start request for the engine 2 and the start of the engine 2 to be shortened without increasing the amount of power consumed by the given accessory 11.

The fifth embodiment exemplifies the structures of the first auto-tensioner 20 and the position holding mechanism 50.

Sixth Embodiment

Figure 11:
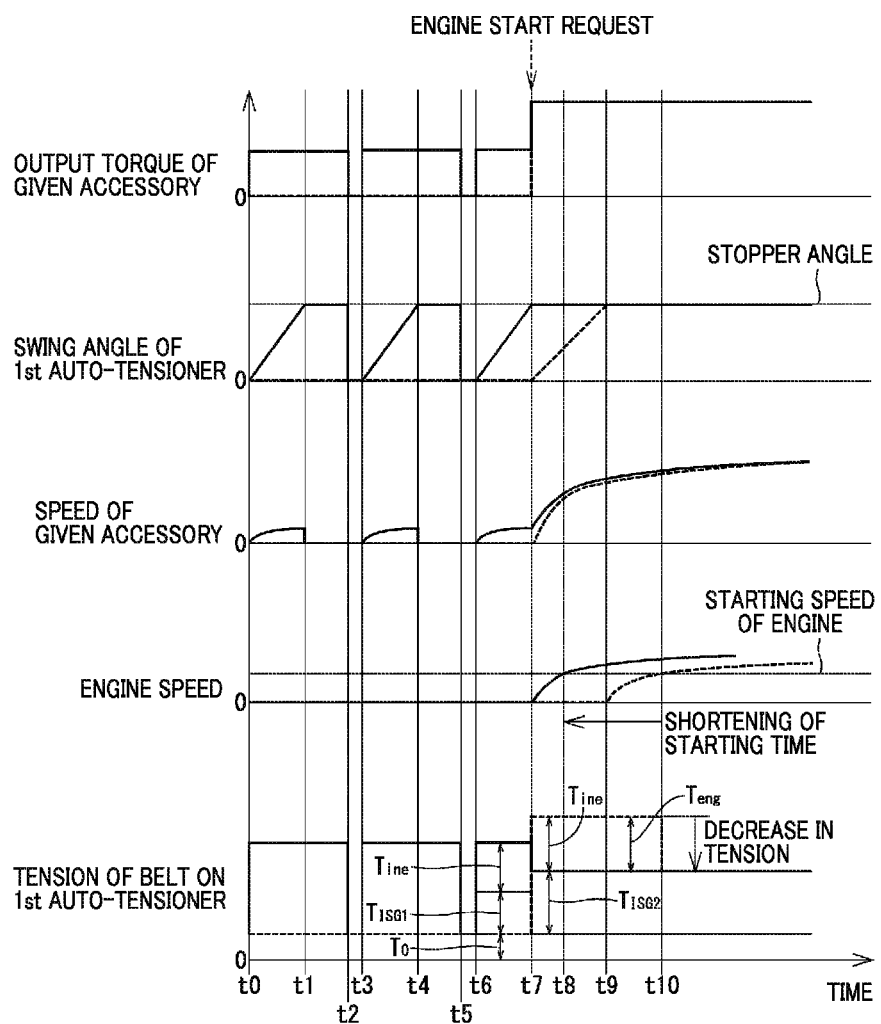
FIG. 11 is a time chart which demonstrates operations of a power transmission system according to the sixth embodiment.

FIG. 11 illustrates an operation of the power transmission system 1 according to the sixth embodiment which is identical in structure with the one in the first embodiment, but different in how the operation of the given accessory 11 is controlled through the ECU 70 when the engine 2 is started.

In FIG. 11, solid lines represent operations of the components of the power transmission system 1 of the sixth embodiment. Broken lines demonstrate the operations of the power transmission system, as already described as a comparative example in FIG. 3.

At time t0 after a lapse of a given time since the stop condition for the engine 2 was met, the ECU 70 starts the given accessory 11 in the motor mode. Specifically, the ECU 70 controls the operation of the given accessory 11 in the motor mode, that is, rotates the given accessory 11 in the normal direction so as to produce a degree of torque which will move the first tensioner pulley 21 in the direction y1. This results in an increase in tension of the belt 9 between the driving pulley 4 and the given accessory pulley 5, thus causing the first tensioner pulley 21 to move or swing, as illustrated in FIG. 1, in the direction y1 against the pressure, as produced by the spring 26.

After time t0, the given accessory 1 continues to operate in the motor mode, so that the arm 22 is brought into contact with the stopper 27 at time t1. The first tensioner pulley 21, thus, lies at the given position that is, as described above, the limit of the relative movable range thereof. The swing angle of the first auto-tensioner 20 will be the stopper angle when the arm 22 contacts the stopper 27.

At time t2 after a lapse of a given period of time since time t0, the ECU 70 stops the operation of the given accessory 11 in the motor mode. This causes the swing angle of the first auto-tensioner 20 to be returned back to zero. In other words, the first auto-tensioner 20 is returned back to the initial angular position.

At time t3 after a lapse of a given period of time since time t2, the ECU 70 resumes the operation of the given accessory 11 in the motor mode, so that the swing angle of the first auto-tensioner 20 will be the stopper angle at time t4. At time t5 after a lapse of a given period of time since time t2, the ECU 70 stops the operation of the given accessory 11 in the motor mode. This causes the swing angle of the first auto-tensioner 20 to be returned back to zero. In other words, the first auto-tensioner 20 is returned back to the initial angular position.

At time t6 after a lapse of a given period of time since time t5, the ECU 70 resumes the operation of the given accessory 11 in the motor mode, so that the swing angle of the first auto-tensioner 20 will be the stopper angle at time t7.

When the engine start condition is met, so that the start request for the engine 2 is made at time t7, the ECU 70 actuates the given accessory 11 as the starter in the motor mode to output a degree of torque great enough to crank the engine 2. At this time, the first tensioner pulley 21 lies at the limit of the relative movable range, so that the tension of the belt 9 between the driving pulley 4 and the given accessory pulley 5 is above a required value. Accordingly, when the ECU 70 actuates the given accessory 11 as the starter at time t7, it immediately rotates the drive shaft 3 (i.e., the driving pulley 4) to crank the engine 2, so that the engine 2 starts fully at time t8.

As apparent from the above discussion, when the start request for the engine 2 is made in the condition where the first tensioner pulley 21 is moved by the operation of the given accessory 11 in the motor mode and then lies at the given position, the power transmission system 1 of this embodiment is capable of shortening, like in the above embodiment, a time interval between the issuing of the start request for the engine 2 and the start of the engine 2.

(7) After the stop request is made to stop the engine 2, the ECU 70 turns on and off the given accessory 11 to bring the first tensioner pulley 21 to the given position cyclically until the start request for the engine 2 is made. This permits the time interval between the issuing of the start request for the engine 2 and the start of the engine 2 to be shortened without increasing the amount of power consumed by the given accessory 11.

Seventh Embodiment

Figure 12:
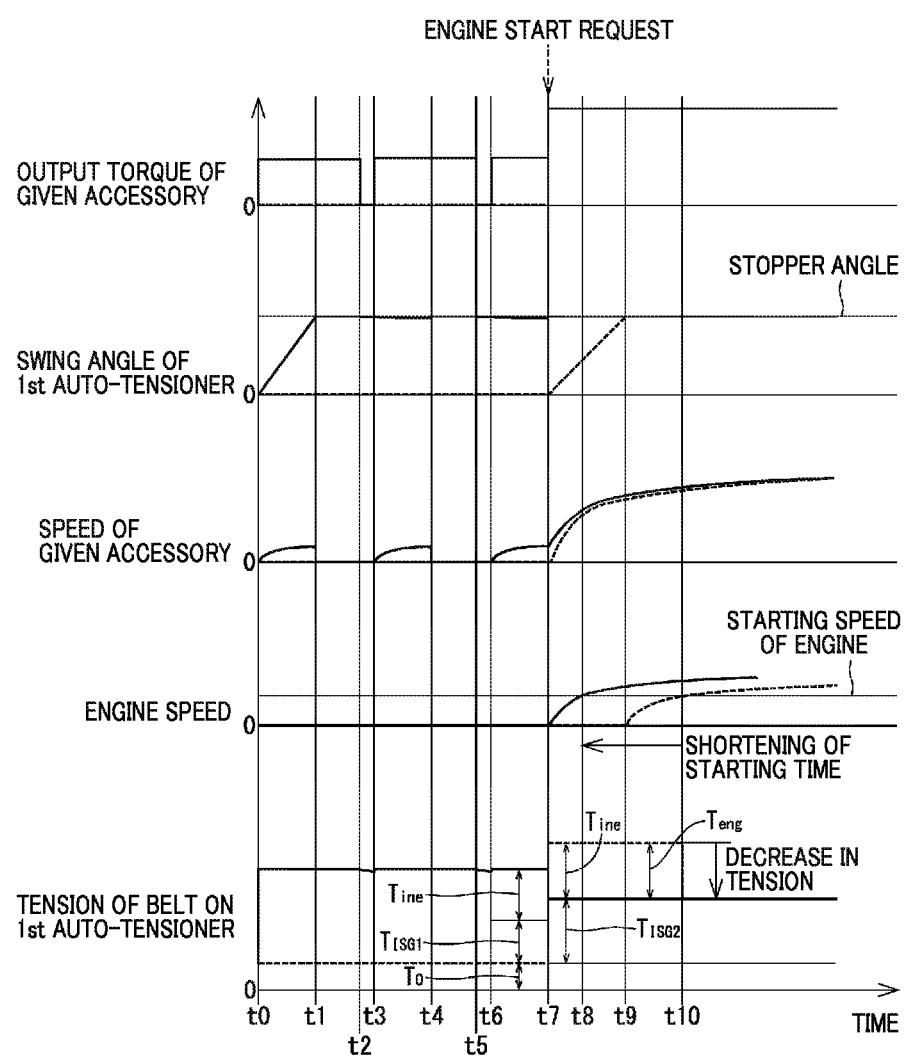
FIG. 12 is a time chart which demonstrates operations of a power transmission system according to the seventh embodiment.

FIG. 12 illustrates an operation of the power transmission system 1 according to the seventh embodiment which is identical in structure with that in the fifth embodiment, but different in how to control the operation of the given accessory 11 through the ECU 70 when the engine 2 is started.

In FIG. 12, solid lines represent operations of the components of the power transmission system 1 of the seventh embodiment. Broken lines demonstrate the operations of the power transmission system, as already described as a comparative example in FIG. 3.

At time t0 after a lapse of a given time since the stop condition for the engine 2 was met, the ECU 70 starts the given accessory 11 in the motor mode. Specifically, the ECU 70 controls the operation of the given accessory 11 in the motor mode, that is, rotates the given accessory 11 in the normal direction so as to produce a degree of torque which will move the first tensioner pulley 21 in the direction y1. This results in an increase in tension of the belt 9 between the driving pulley 4 and the given accessory pulley 5, thus causing the first tensioner pulley 21 to move or swing, as can be seen in FIG. 9, in the direction y1 against the pressure, as produced by the spring 26.

After time t0, the ECU 70 continues to drive the given accessory 1 in the motor mode, so that the arm 22 is brought into contact with the stopper 27 at time t1. At time t1, the first tensioner pulley 21, thus, lies at the given position that is, as described above, the limit of the relative movable range thereof. The swing angle of the first auto-tensioner 20 will be the stopper angle when the arm 22 contacts the stopper 27.

At time t2 after a lapse of a given period of time since time t0, the ECU 70 stops the operation of the given accessory 11 in the motor mode for saving the electric power consumed by the given accessory 11. The position holding mechanism 50 (i.e., the resistance generator 80) continues to hold the first tensioner pulley 21 at or near the given position, thus stopping the first tensioner pulley 21 from swinging further, that is, keeping the swing angle of the first tensioner pulley 21 at the stopper angle after time t2 when the given accessory 11 is stopped.

At time t3 after a lapse of a given period of time since time t2, the ECU 70 resumes the operation of the given accessory 11 in the motor mode, thereby bringing the swing angle of the first auto-tensioner 20, which has been slightly returned after time t2, into agreement with the stopper angle again at time t4. Actually, once the given accessory 11 is stopped, the first auto-tensioner 20 will be slightly returned against the resistance produced by the resistance generator 80, so that the tension of the belt 9 is slightly loosened. The ECU 70, thus, starts the given accessory 11 again at time t3 to increase the degree of tension of the belt 9 up to a required value. At time t5 after a lapse of a given period of time since time t2, the ECU 70 stops the operation of the given accessory 11 in the motor mode again. The position holding mechanism 50 (i.e., the resistance generator 80), as clearly illustrated in FIG. 12, has already produced the resistance and thus continues to hold the first tensioner pulley 21 at or near the given position, thereby keeping the swing angle of the first tensioner pulley 21 at the stopper angle after time t5 when the given accessory 11 is stopped.

At time t6 after a lapse of a given period of time since time t5, the ECU 70 resumes the operation of the given accessory 11 in the motor mode, thereby bringing the swing angle of the first auto-tensioner 20 into agreement with the stopper angle again at time t7.

When the engine start condition is met, so that the start request for the engine 2 is made at time t7, the ECU 70 actuates the given accessory 11 as the starter in the motor mode to output a degree of torque great enough to crank the engine 2. At this time, the first tensioner pulley 21 lies at the limit of the relative movable range, so that the tension of the belt 9 between the driving pulley 4 and the given accessory pulley 5 is above the required value. Accordingly, when the ECU 70 actuates the given accessory 11 as the starter at time t7, it immediately rotates the drive shaft 3 (i.e., the driving pulley 4) to crank the engine 2, so that the engine 2 starts fully at time t8.

As apparent from the above discussion, when the start request for the engine 2 is made after the first tensioner pulley 21 has been moved by the operation of the given accessory 11 in the motor mode and then is held at the given position or while the given accessory 11 is stopping operating in the motor mode after the first tensioner pulley 21 has been moved near the given position (e.g., between time t2 and time t3 or between time t5 and time t6), the power transmission system 1 is capable of shortening the time interval between the issuing of the start request for the engine 2 and the actual start of the engine 2, like in the above embodiments.

The power transmission system 1 of this embodiment is implemented by a combination of the physical structure of the fifth embodiment and the control techniques in the sixth embodiment. Note that the power transmission system 1 may alternatively be engineered to continue to actuate the given accessory 11 in the motor mode after time t0 without stopping it at time t2 or t5 or to operate the given accessory 11 only one time prior to the issuing of the start request for the engine 2.

Eighth Embodiment

Figure 13:
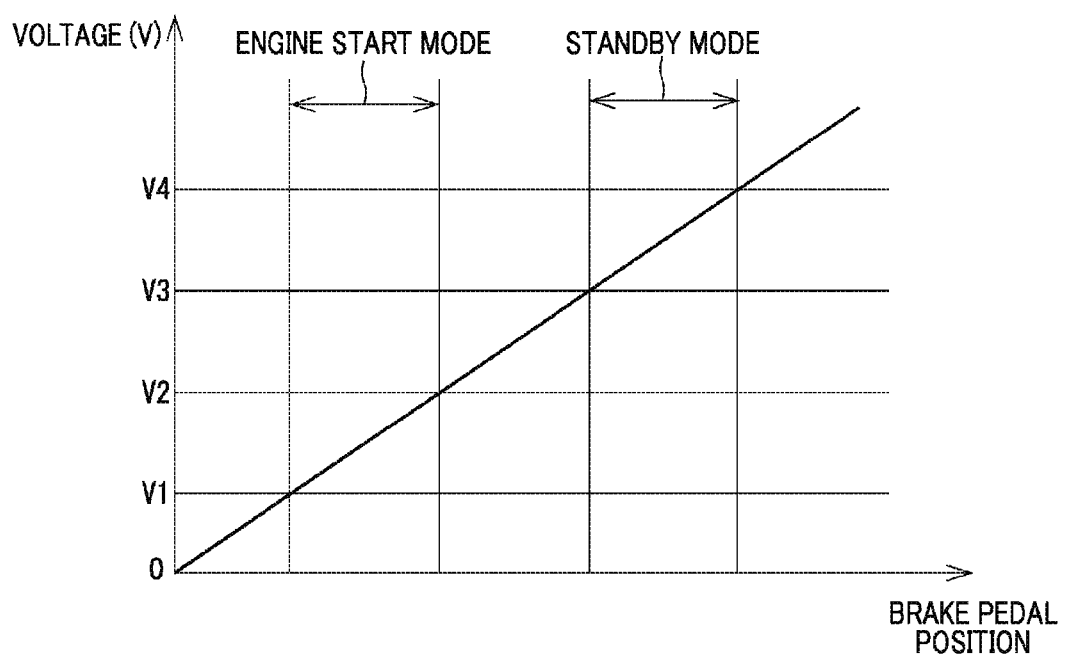
FIG. 13 is a graph which represents an output characteristic of a brake pedal sensor or a brake pressure sensor used with a power transmission system of the eighth embodiment.

The power transmission system 1 of the eighth embodiment will be described below with reference to FIGS. 13 to 15. The power transmission system 1 of this embodiment is identical in physical structure with the one in the first embodiment, but different therefrom in how to control the operation of the given accessory 11 through the ECU 7 when the engine 2 is started.

The ECU 70 works as a timing determiner to determine the time (which will also be referred to as a standby mode timing below) when the given accessory 11 should be actuated in the motor mode to bring the first tensioner pulley 21 to the above described given position prior to the start request for the engine 2. When the standby mode timing is reached, the ECU 70 turns on the given accessory 11 in the motor mode.

Specifically, when required to work as the timing determiner, the ECU 70 monitors a signal outputted in the form of voltage V from the brake pedal sensor 73 or the brake pressure sensor 74 and calculates the standby mode timing as a function of the voltage V. For instance, the voltage V which is as outputted from the brake pedal sensor 73 or the brake pressure sensor 74 to the ECU 70, as illustrated in FIG. 13, usually rises in level in the order of V1, V2, V3, V4 with an increase in amount by which the brake pedal is depressed (i.e., an increase in driver's pedal effort). Conversely, the voltage V drops in level in the order of V4, V3, V2, V1 with a decrease in amount by which the brake pedal is released. The brake pedal sensor 73 is, as can be seen in FIG. 1, connected to the ECU 70 and works to measure the position of a brake pedal installed in the vehicle, in other words, the amount by which the brake pedal is depressed by the driver of the vehicle. The brake pressure sensor 74 is also connected to the ECU 70 and works to measure the pressure of the brake fluid in the vehicle.

When the voltage V has dropped from V4 and met a relation of $V3 \leq V \leq V4$ due to a decrease in release of the brake pedal by the driver of the vehicle, the ECU 70 determines such a time as the standby mode timing. When the amount by which the brake pedal is released has further decreased, so that the voltage V meets a relation of $V1 \leq V \leq V2$, the ECU 70 determines such a time as an engine start timing.

When having determined the standby mode timing, the ECU 70 enters the standby mode and turns on the given accessory 11 in the motor mode to output a degree of torque great enough to swing the first tensioner pulley 21 in the direction y1. When having determined the engine start timing, the ECU 70 actuates the given accessory 11 as the starter in the motor mode to output a degree of torque great enough to crank the engine 2. The engine start timing corresponds to the time when the start condition for starting the engine 2 is met.

The operation of the ECU 70 working as the timing determiner will also be described below in detail with reference to FIG. 14.

FIG. 14 is a flowchart of a sequence of logical steps or timing determination program executed by the ECU 70 when the stop condition to stop the engine 2 is satisfied.

Specifically, when the stop condition is met, the routine enters step S100 to initiate the timing determination program. The routine then proceeds to step S101 wherein the ECU 70 starts to determine the standby mode timing and the engine start timing. Specifically, the ECU 70 starts to monitor the voltage V of an output from the brake pedal sensor 73 or the brake pressure sensor 74. Note that after step S101, the ECU 70 continues to monitor the voltage V.

The routine proceeds to step S102 wherein it is determined whether the standby mode timing is reached or not. Specifically, the ECU 70 determines whether the voltage V of the output from the brake pedal sensor 73 or the brake pressure sensor 74 has dropped by the release of the brake pedal down to a level which meets a relation of $V3 \leq V \leq V4$ or not. If a YES answer is obtained meaning that the standby mode timing is reached, then the routine proceeds to step S103. Alternatively, if a NO answer is obtained, then the routine repeats the operation in step S102.

In step S103, the ECU 70 starts operation of the given accessory 11 in the standby mode. Specifically, the ECU 70 actuates the given accessory 11 in the motor mode to produce a degree of torque great enough to swing the first tensioner pulley 21 in the direction y1 to the given position. The routine then proceeds to step S104. Note that after step S103, the ECU 70 continues to operate the given accessory 11 in the standby mode.

In step S104, it is determined whether the engine start timing is reached or not. Specifically, the ECU 70 determines whether the voltage V of the output from the brake pedal sensor 73 or the brake pressure sensor 74 has dropped by a further release of the brake pedal down to a level which meets a relation of $V1 \leq V \leq V2$ or not. If a YES answer is obtained meaning that the engine start timing is reached, then the routine proceeds to step S105. Alternatively, if a NO answer is obtained, then the routine repeats the operation in step S104.

In step S105, the ECU 70 starts an operation of the given accessory 11 in the engine start mode. Specifically, the ECU 70 actuates the given accessory 11 in the motor mode as the engine starter to produce a degree of torque great enough to crank the engine 2. The engine 2 then starts operating. The routine then terminates.

The operation of the power transmission system 1 of the eighth embodiment will be described below with reference to FIG. 15.

Solid lines in FIG. 15 represent operations of the components of the power transmission system 1. Broken lines demonstrate the operations of the power transmission system, as already described as a comparative example in FIG. 3. In the illustrated example, the stop condition for the engine 2 has been met before time t0. The speed of the engine 2 has already decreased to zero at time t0.

The ECU 70 determines that the standby mode timing is reached at time t1 and then actuates the given accessory 11 in the standby mode. Specifically, the ECU 70 turns on the given accessory 11 in the motor mode to produce a degree of torque great enough to swing the first tensioner pulley 21 in the direction y1. The given accessory 11 rotates in the normal direction, thereby causing the tension of the belt 9 between the driving pulley 4 and the given accessory pulley 5 to increase. After time t1, the given accessory 1 continues to operate in the motor mode, thereby bringing the portion of the end of the arm 22 into contact with the stopper 27 at time t2. The first tensioner pulley 21, thus, lies at the given position that is, as described above, the limit of the relative movable range thereof.

When the engine start condition is met, so that the start request to start the engine 2 is made at time t2, the ECU 70 actuates the given accessory 11 as the starter in the motor mode to output a degree of torque great enough to crank the engine 2. At this time, the first tensioner pulley 21 lies at the limit of the relative movable range, so that the tension of the belt 9 between the driving pulley 4 and the given accessory pulley 5 is above a required value. Accordingly, when the ECU 70 actuates the given accessory 11 as the starter at time t2, it immediately rotates the drive shaft 3 (i.e., the driving pulley 4) to crank the engine 2, so that the engine 2 starts at time t3. In this example, the engine start condition is a condition where the voltage V of an output from the brake pedal sensor 73 or the brake pressure sensor 74 has changed to meet a relation of $V1 \leq V \leq V2$.

The power transmission system 1 of this embodiment is, like the first embodiment, capable of shortening the length of time between the issuing of the start request for the engine 2 and the start of the engine 2 as compared with the above described comparative example of the power transmission system. The power transmission system 1 also eliminates a component of the tension of the belt 9 which will arise from the inertia of the driving pulley 4 and the first tensioner pulley 21, as developed when they start to be rotated suddenly by the given accessory pulley 5 after they are stopped.

(8) The ECU 70 of the power transmission system 1 of this embodiment is equipped with the timing determiner which calculates the standby mode timing that is the time when the given accessory 11 is to be actuated in the motor mode to bring the first tensioner pulley 21 to the above described given position prior to the issuing of the start request for the engine 2. When the standby mode timing is reached, the ECU 70 starts operating the given accessory 11 in the motor mode (i.e., the standby mode). This controls the time interval between the entry of the standby mode of the given accessory 11 and the issuing of the start request for the engine 2 and results in a decrease in time interval between the issuing of the start request for the engine 2 and the actual start of the engine 2.

(9) When required to work as the timing determiner, the ECU 70 analyzes the output from the brake pedal sensor 73 or the brake pressure sensor 74 and calculates the standby mode timing as a function of the output. This embodiment exemplify how the ECU 70 works as the timing determiner.

The power transmission system 1 of the first embodiment is engineered to start operating the given accessory 11 in the motor mode (i.e., the standby mode) after a lapse of a given period of time following the satisfaction of the stop condition for the engine 2 without setting the standby mode timing. This results in a possibility that the start request is made a longer time or a shorter time after the given accessory 11 starts in operating in the motor. In the former case, the amount of electric energy consumed by the given accessory 11 may increase. In the latter case, the given accessory 11 may be actuated as the engine starter when the first tensioner pulley 21 is out of the given position, which results in a difficulty in starting the engine 2 in a short time.

The power transmission system 1 of the eighth embodiment is engineered to alleviate the above problems, that is, capable of controlling the time interval between the entry of the standby mode of the given accessory 11 and the issuing of the start request for the engine 2.

Ninth Embodiment

The power transmission system 1 of this embodiment is identical in physical structure with the one in the eighth embodiment, but different in operation of the ECU 70 working as the timing determiner.

Specifically, when required to work as the timing determiner, the ECU 70 analyzes at least one of a learned information item about a time between when the engine 2 was stopped and when the start request for the engine 2 was issued, an information item about a distance between the vehicle equipped with the power transmission system 1 (which will also be referred to as a system vehicle below) and a preceding vehicle traveling ahead of the system vehicle, as derived through the inter-vehicle communication network, and an information item about traffic jams or traffic lights to calculate the standby mode timing.

Specifically, the ECU 70 performs the timing determination program of FIG. 14 and acquires in step S101 at least one of the learned information item about a time between when the engine 2 was stopped and when the start request for the engine 2 was issued, the information item about a distance between the system vehicle and a preceding vehicle traveling ahead of the system vehicle, as derived through the inter-vehicle communication network, and the information item about traffic jam or a traffic light. In step S102, the ECU 70 calculates the standby mode timing based on the information item, as obtained in step S101. For instance, when the time between the stop of the engine 2 and the issuing of the start request of the engine 2 which has been learned in the ECU 70 expires, or a distance between the system vehicle and a preceding vehicle traveling ahead of the system vehicle exceeds a given value, or the traffic light turns green from red, the ECU 70 determines such a moment as the standby mode timing.

(10) When required to work as the timing determiner, the ECU 70, as described above, acquires at least one of the learned information item about the time between when the engine 2 was stopped and when the start request for the engine 2 was issued, the information item about a distance between the system vehicle and a preceding vehicle traveling ahead of the system vehicle, as derived through the inter-vehicle communication network, and the information item about traffic jam or a traffic light on the road on which the system vehicle is now traveling to calculate the standby mode timing. This controls, like the eighth embodiment, the time interval between the entry of the standby mode of the given accessory 11 and the issuing of the start request for the engine 2, which leads to a decrease in time interval between the issuing of the start request for the engine 2 and the actual start of the engine 2. This embodiment exemplify how the ECU 70 works as the timing determiner.

Tenth Embodiment

The power transmission system 1 of this embodiment is identical in physical structure with the one in the eighth embodiment, but different in condition for initiating the program of FIG. 14, that is, the engine stop condition to stop the engine 2 and operation of the ECU 70 working as the timing determiner.

Specifically, the engine stop condition, as used in this embodiment is a condition that it is required to stop the idling of the engine when the vehicle is at rest, and the brake pedal is being depressed or that it is required to perform a fuel cut of the engine 2 when the accelerator pedal is released, and the vehicle is inertial traveling or coasting.

When required to work as the timing determiner while the idling of the engine 2 is being stopped, the ECU 70, like in the eighth embodiment, analyzes and determines whether the voltage V, as outputted from the brake pedal sensor 73 or the brake pressure sensor 74, meets a relation of $V3 \leq V \leq V4$ or not and decides the time when such a relation is met as the standby mode timing. The ECU 70 also decides the time when the voltage V meets a relation of $V1 \leq V \leq V2$ as the engine start timing.

Additionally, when required to work as the timing determiner while the idling of the engine 2 is being stopped, the ECU 70 determines, as the standby mode timing, the time when the speed of the engine 2, as measured by the speed sensor 71, has dropped below a speed (which will also be referred to as a minimum self-startable or minimum starterless startable rotational speed) at or above which the engine 2 is enabled to start running by itself without use of the starter (i.e., the given accessory 11). The ECU 70 also determines the time when the depression of the accelerator pedal is detected by the accelerator pedal sensor 75 as the engine start timing.

Specifically, the ECU 70 performs the timing determination program of FIG. 14 and in step S101 starts monitoring the outputs from the brake pedal sensor 73, the brake pressure sensor 74, the speed sensor 71, and the accelerator pedal sensor 75. Subsequently, in step S102, the ECU 70 determines the standby mode timing based on the outputs, as monitored in step S101. In step S104, the ECU 70 also determines the engine start timing based on the outputs, as monitored in step S101.

The operation of the power transmission system 1 of the tenth embodiment will be described below with reference to FIGS. 16 and 17.

Solid lines in FIGS. 16 and 17 represent examples of operations of the components of the power transmission system 1. Broken lines demonstrate the operations of the power transmission system, as already described as a comparative example in FIG. 3. In the illustrated examples, the stop condition for the engine 2 has been met, and the engine 2 has been subjected to a fuel cut before time t0.

FIG. 17 demonstrates the example wherein the vehicle is stopped during the fuel-cut, and the brake pedal is depressed, after which the brake pedal is released, and it is required to start the engine 2. At time t1 when the speed of the engine 2 has dropped below the minimum self-startable rotational speed, the ECU 70 determines the standby mode timing and then starts the operation of the given accessary in the motor mode to place it in the standby mode. After time t1, the given accessary 1 continues to operate in the motor mode, so that the first tensioner pulley 21 lies at the given positon at time t2. At time t3, the ECU 70 detects the fact that the vehicle is stopped, and the brake pedal is depressed and then switches the fuel cut mode to the idling stop mode. Operations between time t4 and time t7 are the same as those between time t2 and time t5 in FIG. 15, and explanation thereof in detail will be omitted here.

FIG. 18 demonstrates the example wherein the accelerator pedal is depressed to start the engine 2 during the fuel-cut. At time t1 when the speed of the engine 2 has dropped below the minimum self-startable rotational speed, the ECU 70 determines the standby mode timing and then starts the operation of the given accessary in the motor mode to place it in the standby mode. After time t1, the given accessary 1 continues to operate in the motor mode, so that the first tensioner pulley 21 lies at the given positon at time t2. At time t3, the ECU 70 detects the depression of the accelerator pedal and determines the engine start timing. The ECU 70 then starts the operation of the given accessory 11 in the motor mode to place it in the engine start mode as the engine starter. Operations between time t3 and time t6 are the same as those between time t2 and time t5 in FIG. 15, and explanation thereof in detail will be omitted here.

As apparent from the above discussion, the power transmission system 1 of the tenth embodiment is, like in the first embodiment, engineered to shorten the time between the issuing of the start request and the actual start of the engine 2 and also to decrease the tension of the belt 9 on the first tensioner pulley 21 after the start request for the engine 2.

(11) When required to work as the timing determiner, the ECU 70, as described above, determines, as the standby mode timing, the time when the speed of the engine 2, as measured by the speed sensor 71, has dropped below the minimum self-startable rotational speed, thereby controlling the time interval between the entry of the standby mode of the given accessory 11 and the start of the engine 2 appropriately. This embodiment exemplify how the ECU 70 works as the timing determiner.

Modifications

The power transmission system 1 of the above embodiments works to operate the given accessory 11 in the motor mode to move the first tensioner pulley 21 to the given position that is the limit of the relative movable range of the first tensioner pulley 21 before the start request to start the engine 2 is made, but may be engineered to move the first tensioner pulley 21 to another position within the relative movable range where the degree of tension of the belt 9 between driving pulley 4 and the given accessory pulley 5 is increased. This also results in a decrease in time between the issuing of the start request for the engine 2 and the actual start of the engine 2.

The power transmission system 1 may optionally not be equipped with the second auto-tensioner 20. Even in such a case, the power transmission system 1 is capable of actuating the given accessory 11 in the motor mode to move the first tensioner pulley 21 to or near the given position before the start request to start the engine 2 is made for bringing the degree of tension of the belt 9 between the driving pulley 4 and the given accessory pulley 5 into agreement with a desired level which will shorten the time between the issuing of the start request for the engine 2 and the actual start of the engine 2.

The power transmission system 1 of the fourth embodiment is equipped with the position holding mechanism 50 which serves to control the degree of extension of the tensioner body 40 to hold the first tensioner pulley 2 at a desired position, but may alternatively be designed to change the location of the tensioner body 40 relative to the arm 22 and then control or hold the contraction of the tensioner body 40 through the position holding mechanism 50 to keep the tensioner body 40 at a desired position.

The position holding mechanism 50 of the power transmission system 1 of the fourth embodiment includes the first fluid chamber 51, the second fluid chamber 52, the fluid 53, and the control valve 60. The ECU 70 controls the operation of the control valve 60 to inhibit the extension of the tensioner body 40, thereby holding the first tensioner pulley 21 at the given position, however, the position holding mechanism 50 may alternatively be designed to have another structure as long as it is capable of control or inhibit the extension or contraction of the tensioner body 40 in response to a control signal from the ECU 70.

The resistance generator 80 installed in the power transmission system 1 of the fifth embodiment is made up of the two frictional plates placed in contact with each other, however, may alternatively be equipped with a damper which uses a fluid resistance. For instance, the damper is disposed between the end of the arm 22 and the base 25 to create the fluid resistance between the arm 22 and the base 25 when the arm 22 and the base 25 rotate relative to each other. In other words the damper works to produce resistance to the rotation or swing of the arm 22 relative to the engine 2.

The power transmission system 1 may be designed to include all possible combinations of the first to ninth embodiments. For instance, the power transmission system 1 of each of the embodiments may be engineered to execute the function to control the tension of the belt 9, as described in another embodiment.

The engine stop condition to stop the engine 2, as used in the above embodiments, is the condition where after the vehicle stops, the rotation sensor 71 detects the fact that the speed of the driving pulley 4 (i.e., the drive shaft 3) has dropped below the given value, but may alternatively be a condition where a given period of time has passed after the vehicle is stopped, that is, the speed of the vehicle has dropped to zero.

The power transmission system 1 of the above embodiments includes the three accessories 13, 15, and 17, and the three accessory pulleys 6, 7, and 8, however, may be equipped with one or a plurality of accessories and one or a plurality of accessory pulleys other than three.

The power transmission system 1 may also include an additional accessory pulley between the first tensioner pulley 21 and the given accessory pulley 5.

Instead of the endless belt 9 made of rubber, a metallic endless chain may be used.

The transmission (e.g., an automatic transmission) which is installed in the automotive vehicle in mechanical connection with the drive shaft 3 (i.e., the output shaft of the engine 2), as referred to above, is used as an object driven by the torque outputted from the engine 2, however, transmissions installed in other vehicles may be used to be driven by the output of the engine 2 in the above embodiments. Alternatively, machines other than the transmission may be used to be driven by the output of the engine 2 in the above embodiments.

The power transmission system 1 of the above embodiments has the first tensioner pulley 21 disposed between the driving pulley 4 (i.e., the crankshaft of the engine 2) and the given accessory pulley 5, however, the first tensioner pulley 21 may alternatively be located upstream of the driving pulley 4 in the normal direction of the belt 9. For instance, the given accessory 11 may be replaced in position with the accessory pulley 8. In this case, the first auto-tensioner 20 is capable of increasing the degree of tension of the belt 9 between the driving pulley 4 and the given accessory pulley 5 through the operation of the given accessory 11 in the motor mode.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A power transmission system which works to transmit power, as produced by an internal combustion engine, to a first auxiliary device and a second auxiliary device, the first auxiliary device being operable either in a motor mode or in a regenerative mode, comprising:
    a driving pulley which is joined to a drive shaft of the internal combustion engine to be rotatable along with rotation of the drive shaft;
    a first auxiliary device pulley which is joined to a shaft of the first auxiliary device to be rotatable along with rotation of the shaft of the first auxiliary device;
    a second auxiliary device pulley which is joined to a shaft of the second auxiliary device to be rotatable along with rotation of the shaft of the second auxiliary device;
    an endless transmitting member which is wound around the driving pulley, the first auxiliary device pulley, and the second auxiliary device pulley;
    a first auto-tensioner equipped with a first tensioner pulley which is rotatable in contact with the endless transmitting member, the first tensioner pulley being also moveable relative to the internal combustion engine to change a degree of tension of the endless transmitting member; and
    a controller which works to control an operation of the first auxiliary device, the controller actuating the first auxiliary device in the motor mode to move the first tensioner pulley to a given position prior to issuing of a start request to start the internal combustion engine,
    wherein the given position is a limit of a relative movable range in which the first tensioner pulley is movable relative to the internal combustion engine.

2. A power transmission system which works to transmit power, as produced by an internal combustion engine, to a first auxiliary device and a second auxiliary device, the first auxiliary device being operable either in a motor mode or in a regenerative mode, comprising:
    a driving pulley which is joined to a drive shaft of the internal combustion engine to be rotatable along with rotation of the drive shaft;
    a first auxiliary device pulley which is joined to a shaft of the first auxiliary device to be rotatable along with rotation of the shaft of the first auxiliary device;
    a second auxiliary device pulley which is joined to a shaft of the second auxiliary device to be rotatable along with rotation of the shaft of the second auxiliary device;
    an endless transmitting member which is wound around the driving pulley, the first auxiliary device pulley, and the second auxiliary device pulley;
    a first auto-tensioner equipped with a first tensioner pulley which is rotatable in contact with the endless transmitting member, the first tensioner pulley being also moveable relative to the internal combustion engine to change a degree of tension of the endless transmitting member;
    a controller which works to control an operation of the first auxiliary device, the controller actuating the first auxiliary device in the motor mode to move the first tensioner pulley to a given position prior to issuing of a start request to start the internal combustion engine; and
    a second auto-tensioner equipped with a second tensioner pulley which is disposed to be rotatable in contact with the endless transmission member on an opposite side of the first auxiliary device pulley to the first tensioner pulley, the second tensioner pulley being moveable relative to the internal combustion engine to change the degree of tension of the endless transmission member.

3. A power transmission system which works to transmit power, as produced by an internal combustion engine, to a first auxiliary device and a second auxiliary device, the first auxiliary device being operable either in a motor mode or in a regenerative mode comprising:
    a driving pulley which is joined to a drive shaft of the internal combustion engine to be rotatable along with rotation of the drive shaft;
    a first auxiliary device pulley which is joined to a shaft of the first auxiliary device to be rotatable along with rotation of the shaft of the first auxiliary device;
    a second auxiliary device pulley which is joined to a shaft of the second auxiliary device to be rotatable along with rotation of the shaft of the second auxiliary device;

an endless transmitting member which is wound around the driving pulley, the first auxiliary device pulley, and the second auxiliary device pulley;
a first auto-tensioner equipped with a first tensioner pulley which is rotatable in contact with the endless transmitting member, the first tensioner pulley being also movable relative to the internal combustion engine to change a degree of tension of the endless transmitting member;
a controller which works to control an operation of the first auxiliary device, the controller actuating the first auxiliary device in the motor mode to move the first tensioner pulley to a given position prior to issuing of a start request to start the internal combustion engine; and
a position holding mechanism which works to hold the first tensioner pulley at the given position to which the controller actuates the first auxiliary device in the motor mode to move the first tensioner pulley,
wherein the first auto-tensioner includes a tensioner body and a biasing mechanism, the tensioner body being expandable and contractable in a given direction to move the first tensioner pulley relative to the engine, the biasing mechanism working to bias the tensioner body to expand in the given direction, and wherein the position holding mechanism includes a first fluid chamber, a second fluid chamber, a fluid, and a control valve, the first chamber being formed in the tensioner body to have a volume which decreases with contraction of the tensioner body and increases with expansion of the tensioner body, the second fluid chamber being formed in the tensioner body in fluid communication with the first fluid chamber, the fluid being within the first fluid chamber and the second fluid chamber, the control valve being driven by the controller to selectively establish and block fluid communication between the first fluid chamber and the second fluid chamber, thereby inhibiting the expansion or the contraction of the tensioner body to hold the first tensioner pulley at the given position.

4. A power transmission system which works to transmit power, as produced by an internal combustion engine, to a first auxiliary device and a second auxiliary device, the first auxiliary device being operable either in a motor mode or in a regenerative mode, comprising:
a driving pulley which is joined to a drive shaft of the internal combustion engine to be rotatable along with rotation of the drive shaft;
a first auxiliary device pulley which is joined to shaft of the first auxiliary device to be rotatable along with rotation of the shaft of the first auxiliary device;
a second auxiliary device pulley which is joined to a shaft of the second auxiliary device to be rotatable along with rotation of the shaft of the second auxiliary device;
an endless transmitting member which is wound around the driving pulley, the first auxiliary device pulley, and the second auxiliary device pulley;
a first auto-tensioner equipped with a first tensioner pulley which is rotatable in contact with the endless transmitting member, the first tensioner pulley being also movable relative to the internal combustion engine to change a degree of tension of the endless transmitting member;
a controller which works to control an operation of the first auxiliary device, the controller actuating the first auxiliary device in the motor mode to move the first tensioner pulley to a given position prior to issuing of a start request to start the internal combustion engine; and
a position holding mechanism which works to hold the first tensioner pulley at the given position to which the controller actuates the first auxiliary device in the motor mode to move the first tensioner pulley,
wherein the first auto-tensioner includes an arm which rotatably supports the first tensioner pulley and is rotatable relative to the internal combustion engine, wherein the position holding mechanism is equipped with a resistance generator which works to create resistance to rotation of the arm relative to the internal combustion engine, thereby holding the first tensioner pulley at or near the given position.

5. A power transmission system which works to transmit power, as produced by an internal combustion engine, to a first auxiliary device and a second auxiliary device, the first auxiliary device being operable either in a motor mode or in a regenerative mode, comprising:
a driving pulley which is joined to a drive shaft of the internal combustion engine to be rotatable along with rotation of the drive shaft;
a first auxiliary device pulley which is joined to a shaft of the first auxiliary device to be rotatable along with rotation of the shaft of the first auxiliary device;
a second auxiliary device pulley which is joined to a shaft of the second auxiliary device to be rotatable along with rotation of the shaft of the second auxiliary device;
an endless transmitting member which is wound around the driving pulley, the first auxiliary device pulley, and the second auxiliary device pulley;
a first auto-tensioner equipped with a first tensioner pulley which is rotatable in contact with the endless transmitting member, the first tensioner pulley being also movable relative to the internal combustion engine to change a degree of tension of the endless transmitting member; and
a controller which works to control an operation of the first auxiliary device, the controller actuating the first auxiliary device in the motor mode to move the first tensioner pulley to a given position prior to issuing of a start request to start the internal combustion engine,
wherein the controller selectively turns on and off the first auxiliary device to produce torque cyclically for keeping the first tensioner pulley at the give position until the start request is made after a stop condition to stop the internal combustion engine is met.

6. A power transmission system which works to transmit power, as produce by an internal combustion engine, to a first auxiliary device and a second auxiliary device, the first auxiliary device being operable either in a motor mode or in a regenerative mode, comprising:
a driving pulley which is joined to a drive shaft of the internal combustion engine to be rotatable along with rotation of the drive shaft;
a first auxiliary device pulley which is joined to a shaft of the first auxiliary device to be rotatable along with rotation of the shaft of the first auxiliary device;
a second auxiliary device pulley which is joined to a shaft of the second auxiliary device to be rotatable along with rotation of the shaft of the second auxiliary device;
an endless transmitting member which is wound around the driving pulley, the first auxiliary device pulley, and the second auxiliary device pulley;
a first auto-tensioner equipped with a first tensioner pulley which is rotatable in contact with the endless transmitting member, the first tensioner pulley being also movable relative to the internal combustion engine to change a degree of tension of the endless transmitting member; and a controller which works to control an operation of the first auxiliary device, the controller actuating the first auxiliary device in the motor mode to move the first tensioner pulley to a given position prior to issuing of a start request to start the internal combustion engine, wherein the controller includes a timing determiner which determines a standby mode timing that is a time when the first auxiliary device is to be actuated to move the first tensioner pulley to the given position prior to issuing the start request for the internal combustion engine, and wherein when the standby mode timing is reached, the controller actuates the first auxiliary device in the motor mode.

7. A power transmission system as set forth in claim 6, wherein the timing determiner determines a time when a speed of the internal combustion engine has dropped below a self-startable rotational speed of the internal combustion engine as the standby mode timing.

8. A power transmission system as set forth in claim 6, wherein the timing determiner analyzes an output from a brake pedal sensor or a brake pressure sensor installed in a vehicle in which the internal combustion engine is mounted to calculate the standby mode timing.

9. A power transmission system as set forth in claim 6, wherein the timing determiner analyzes at least one of learned information item about a time between when the internal combustion engine was stopped and when the start request for the engine was issued, information item about a distance between the vehicle equipped with the power transmission system and a preceding vehicle traveling ahead of the vehicle, as derived through an inter-vehicle communication network, and information item about traffic jam or a traffic light to calculate the standby mode timing.

* * * * *